(12) United States Patent
Ravinathan et al.

(10) Patent No.: US 12,555,106 B2
(45) Date of Patent: Feb. 17, 2026

(54) DIGITIZATION OF PAYMENT CARDS FOR WEB 3.0 AND METAVERSE TRANSACTIONS

(71) Applicant: MASTERCARD ASIA/PACIFIC PTE. LTD., Singapore (SG)

(72) Inventors: Srinath Ravinathan, Singapore (SG); Karl Cheng, Singapore (SG); Donghao Huang, Singapore (SG); Shi Ler Shila Chew, Singapore (SG); Dendy Gunawan, Singapore (SG); Putu Arie Ganapathi, Singapore (SG); Phuoc Hoang Long Le, Singapore (SG)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 129 days.

(21) Appl. No.: 18/368,749

(22) Filed: Sep. 15, 2023

(65) Prior Publication Data
US 2024/0104560 A1    Mar. 28, 2024

Related U.S. Application Data

(60) Provisional application No. 63/407,501, filed on Sep. 16, 2022.

(51) Int. Cl.
*G06Q 20/02*    (2012.01)
*G06Q 20/38*    (2012.01)
*G06Q 20/40*    (2012.01)

(52) U.S. Cl.
CPC ......... *G06Q 20/3829* (2013.01); *G06Q 20/02* (2013.01); *G06Q 20/401* (2013.01); *G06Q 2220/00* (2013.01)

(58) Field of Classification Search
CPC .......... G06Q 2220/00; G06Q 20/3829; G06Q 20/401; G06Q 20/02
See application file for complete search history.

(56) References Cited

U.S. PATENT DOCUMENTS

2016/0253651 A1\* 9/2016 Park ..................... G06Q 20/34
705/39
2020/0074455 A1   3/2020 Hunter et al.
(Continued)

FOREIGN PATENT DOCUMENTS

CN    115345729 A  \* 11/2022
WO    2023039344 A1    3/2023

OTHER PUBLICATIONS

Smith, NPD with the Metaverse, NFTs, and Crypto, Research technology management, Sep. 2022, vol. 65 (5), p. 54-56.\*

(Continued)

*Primary Examiner* — Ilse I Immanuel
(74) *Attorney, Agent, or Firm* — Talem IP Law, LLP

(57) ABSTRACT

Systems and techniques for digitization of payment cards for Web 3.0 ("Web3") and metaverse transactions are provided. The described systems and techniques allow for the use of non-fungible tokens (NFTs) to represent a payment token for making a payment inside a Web3 and Metaverse environment. Indeed, the described systems and techniques provide a financial NFT enabled representation of a payment card account as a token in a blockchain network, which can then be used to facilitate Web3 payments with real-time fiat to crypto exchanges.

15 Claims, 22 Drawing Sheets

(56) References Cited

U.S. PATENT DOCUMENTS

2020/0389301 A1    12/2020  Detres et al.
2023/0376949 A1*   11/2023  Filter .................. G06Q 20/065

OTHER PUBLICATIONS

International Search Report and Written Opinion issued in International Application No. PCT/SG2023/050630, mailed Dec. 19, 2023, 11 pages.
Tam, Mia, "What Is Solv Protocol," Asia Crypto Today, Nov. 15, 2021, Retrieved: Dec. 12, 2023, Retrieved from: https://www.asiacryptotoday.com/solv-protocol/, 5 pages.

* cited by examiner

DIGITIZATION OF PAYMENT CARDS FOR WEB 3.0 AND METAVERSE TRANSACTIONS

BACKGROUND

Web 3.0 (Web3) and Metaverse are becoming popular with significant investments from industry in the next few years. Currently, payment in Web3/Metaverses either rely on Web3/Metaverse specific tokens, either as a cryptocurrency tokens or as other platform specific credit. This locks funds to a specific ecosystem, and in the case of cryptotokens, the price is volatile due to the volatile nature of cryptocurrency. Even for cases where payment is in fiat currencies, users would need to enter their payment method on each platform that they want to make payment with.

BRIEF SUMMARY

Systems and techniques for digitization of payment cards for Web 3.0 ("Web3") and metaverse transactions are provided. The described systems and techniques allow for the use of non-fungible tokens (NFTs) to represent a payment token for making a payment inside a Web3 and Metaverse environment. Indeed, the described systems and techniques provide a financial NFT enabled representation of a payment card account as a token in a blockchain network, which can then be used to facilitate Web3 payments with real-time fiat to crypto exchanges.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 4-8 illustrate example operating environments and signal flows for financial NFT person-to-merchant (P2M) payment transaction use cases according to embodiments of the invention. FIG. 4 illustrates a use case for guest checkout with a financial NFT in Web3; FIG. 5 illustrates a use case for guest checkout with a financial NFT in Web2; FIG. 7 illustrates a use case for a payment made with a financial NFT COF in Web3; and FIG. 8 illustrates a use case for a payment made with a financial NFT COF in Web2.

FIG. 9 illustrates a fiat-to-fiat use case; FIG. 10 illustrates a fiat-to-crypto use case; and FIG. 11 illustrates a crypto-to-crypto use case.

FIG. 17 illustrates an example scenario of tokenizing a payment card for Web3 and metaverse transactions; FIG. 18 illustrates an example scenario of bidding on an NFT with the tokenized payment card; and FIG. 19 illustrates an example scenario of an NFT transfer from a seller to a user of a winning bid.

DETAILED DESCRIPTION

Figure 1:
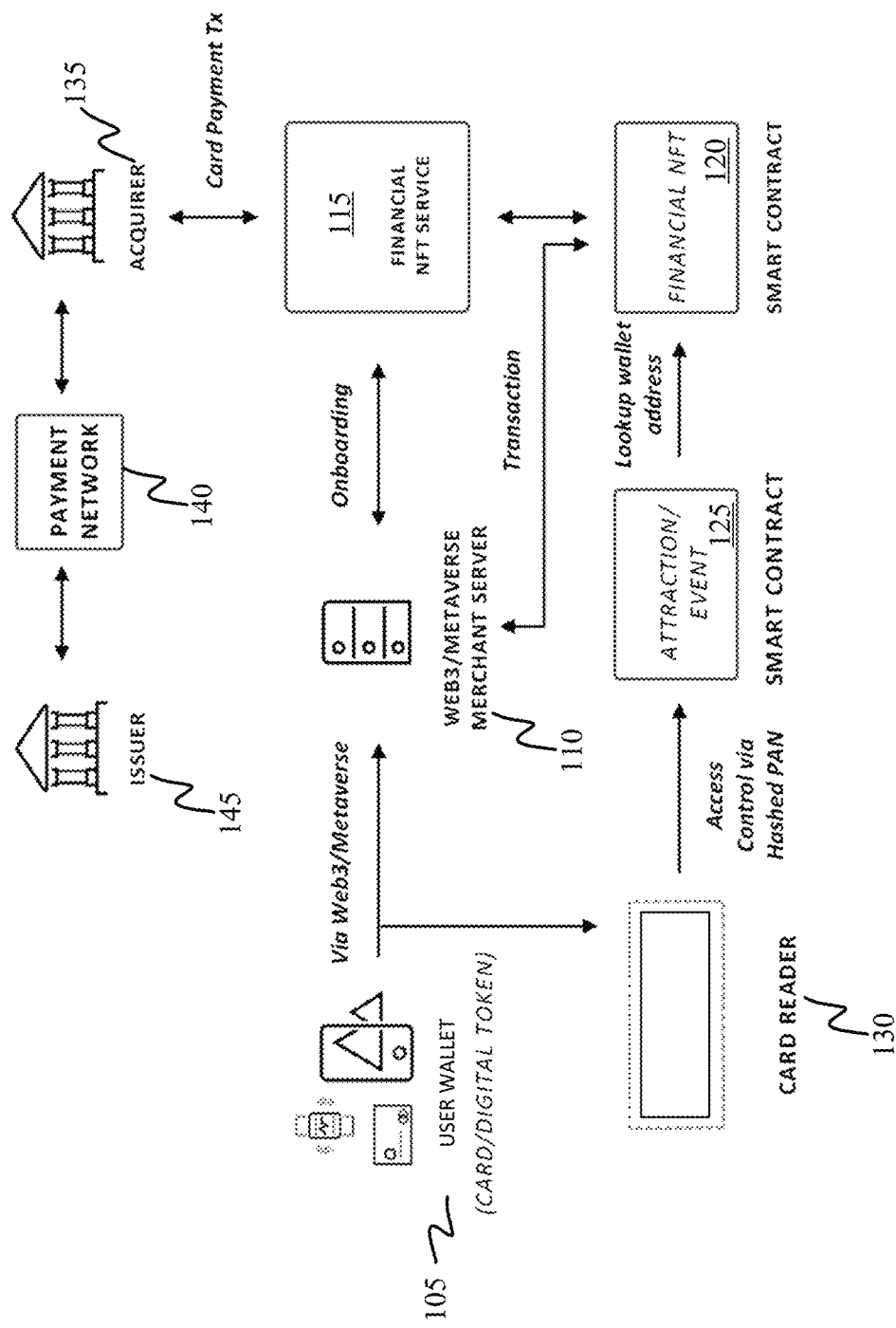
FIG. 1 illustrates an example operating environment in which various embodiments of the invention may be practiced.

Systems and techniques for digitization of payment cards for Web 3.0 ("Web3") and metaverse transactions are provided. The described systems and techniques allow for the use of non-fungible tokens (NFTs) to represent a payment token for making a payment inside a Web3 and Metaverse environment.

Definitions

"Cryptocurrency" ("crypto") refers to a digital currency in which transactions are verified and records maintained by a decentralized system using cryptography, rather than by a centralized authority. Examples of cryptocurrency include Bitcoin, Ethereum, Tether, Solana, and Dogecoin.

"Fiat currency" refers to a government-issued currency that is not backed by a physical commodity, such as gold or silver, but rather by the government that issued it. Examples of fiat currency include, but are not limited to, the U.S. dollar, the British pound, the Indian rupee, and the euro.

"Non-fungible tokens" ("NFTs") refer to digital tokens on a blockchain, each of which represents a distinct digital/physical asset. Each NFT is unique and cannot be swapped for another version of itself As used herein, a "financial NFT" refers to a publicly verifiable and non-transferable NFT that represents a tokenized payment card. Each financial NFT can be powered by, for example, ERC-721 smart contracts deployed on the supported blockchains. Each financial NFT has multiple on-chain data elements, such as, but not limited to, Token ID: unique identifier, Token URI: link to metadata, Hashed primary account number ("PAN"): one-way hash of PAN, and Status: active/inactive/blocked. Token metadata can be stored in peer-to-peer distributed file systems, e.g., InterPlanetary File System (IPFS) and can contain data elements (in JSON format) such as, but not limited to, name, description, image, and list of customized attributes.

An example code listing for a financial NFT includes:

```
{
  "name": "**** 3821",
      "description": "Payment Card, ending 3821",
      "image": "ipfs://QmWtmlnLSADTBhjUVmr4Hj9QWBnnxjSkk78DEb3uBJdQ8w",
      "attributes": [
    {
        "trait_type": "ownerAddress",
        "value": "0x507222b2eA12829882210ab5fb6d4868199d835e"
    },
    {
        "trait_type": "hashedPAN",
        "value":
"3145269513c69897a766b343be61736803a3f58904bc3c7c1ab51f5c72769b3a"
    },
    {
        "trait_type": "tokenAPI",
        "value": "https://card-nft.com/tokens"
    }
  ]
}
```

Payments with financial NFT are recorded in blockchain and transparent. That is, payment cards are tokenized as a financial NFT and put on the blockchain itself. Since the user owns the financial NFT, the user can generate a cryptogram that could be used on the existing payment card rails. The tokenization provides just a one-time token to the Web3/Metaverse merchant. Therefore, the financial NFT is more secure as the merchant does not have any payment data of the user.

"Tokenization" refers to the process of replacing a card's primary account number (PAN)—the 16-digit number on the plastic card—with a unique alternate card number, or "token." Tokens can be used for mobile point-of-sale transactions, in-app purchases or online purchases.

"Minting an NFT" refers to the process of publishing a digital asset on the blockchain.

A "smart contract" refers to a fixed piece of code in an application layer of a blockchain that directly and automatically controls the transfer of digital assets between the parties under certain conditions.

"Metaverse" refers to a simulated digital environment that uses augmented reality (AR), virtual reality (VR), and blockchain.

A "web2 wallet" refers to a custodial digital wallet.

A "web3 wallet" or "crypto wallet" refers to a digital wallet that stores private keys, which are used to access and manage cryptocurrency and blockchain-based assets, such as NFTs. When a user creates a web3 wallet, the user is given a unique private key which is used to prove ownership of their digital assets. This private key is then used to generate a corresponding public key, which can be used to verify the authenticity of transactions. By using these keys together, a web3 wallet can enable digital identity and prove ownership of digital assets in a secure and decentralized way. Examples of a web3 wallet include, but are not limited to, a non-custodial wallet, a custodial wallet, and a smart contract wallet.

A "private key" refers to a secret piece of information that is used to prove ownership of digital assets. It is used to sign transactions that are sent to the blockchain, and it is only known to the owner of the digital assets.

A "public key" refers to a piece of information that is used to prove that a transaction was signed by the owner of a digital asset. It is used to verify the authenticity of transactions and can be shared publicly.

A "public address" can be derived from the public key and can be shared publicly, allowing others to send digital assets to the user's wallet. By providing a unique public address, a web3 wallet can enable digital identity and prove ownership of digital assets in a secure and decentralized way.

"transaction identifier", or "transaction hash", is a unique string of characters providing proof that a transaction has been verified and added to the blockchain. The transaction hash can be used to provide confirmation that the transaction was made and to look up transaction details, such as, but not limited to, sending address, receiving address, amount, date and time, network fees, and confirmations.

A "merchant" refers to a provider of goods or services in exchange for payment. The merchant can be physically present at the sale or remote, such as an online retailer.

An "acquirer" refers to a party that processes payments on behalf of the merchant in a payment card transaction. The acquirer can be a bank system or other institution associated with the merchant.

An "issuer" refers to a bank system or other institution that provides payment cards to the cardholder.

The terms "user", "customer", and "consumer" are used interchangeably herein.

An "oracle" refers to an application that sources, verifies, and transmits external information (i.e., information stored off of a blockchain) to smart contracts running on the blockchain.

The current payment method in the Web3/Metaverse crypto world is limited to proprietary coin/token belonging to that Web3/Metaverse blockchain. Even with using fiat currency, a provider of the Web3/Metaverse application is the one holding onto the payment data. This limits users to a specific ecosystem. Advantageously, through the described systems and techniques, a user can have the payment method securely tokenized across multiple blockchains with the seamless in-game payment experience via a financial NFT. A financial NFT is unique and cannot be duplicated in the Web3/Metaverse crypto world. Thus, using the financial NFT for payment would be greatly beneficial. For security, a user can revoke the financial NFT anytime.

Payments made with a financial NFT are recorded in blockchain and transparent. That is, payment cards are tokenized as a financial NFT and put on the blockchain itself. Since the user owns the financial NFT, the user can generate a cryptogram that can be used on the existing payment card rails. The tokenization provides just a one-time token to the Web3/Metaverse merchant. Therefore, the financial NFT provides for increased security over current payment methods in the Web3/Metaverse crypto world, as the merchant does not have any payment data of the user.

Currently, to use an existing payment card on the Web3/Metaverse world, a user must first go to an exchange to add payment means to their crypto wallet. Only then is the user able to make a payment via an existing payment card in the Web3/Metaverse world. Further, in a Web3/Metaverse world, where everything is decentralized, there is no standard to make a real time exchange. Indeed, current crypto exchanges are not integrated with Web3/Metaverse payments. Advantageously, the described systems and techniques enable real-time payment card to crypto exchanges for Web3/Metaverse payments.

FIG. 1 illustrates an example operating environment in which various embodiments of the invention may be practiced. Referring to FIG. 1, an example operating environment can include a user wallet 105, a Web3/Metaverse merchant server 110, one or more financial NFT services (e.g., financial NFT service 115), a financial NFT smart contract 120, an attraction/event NFT 125, a card reader 130, an acquirer 135, a payment network 140, and an issuer 145.

Figure 2A:
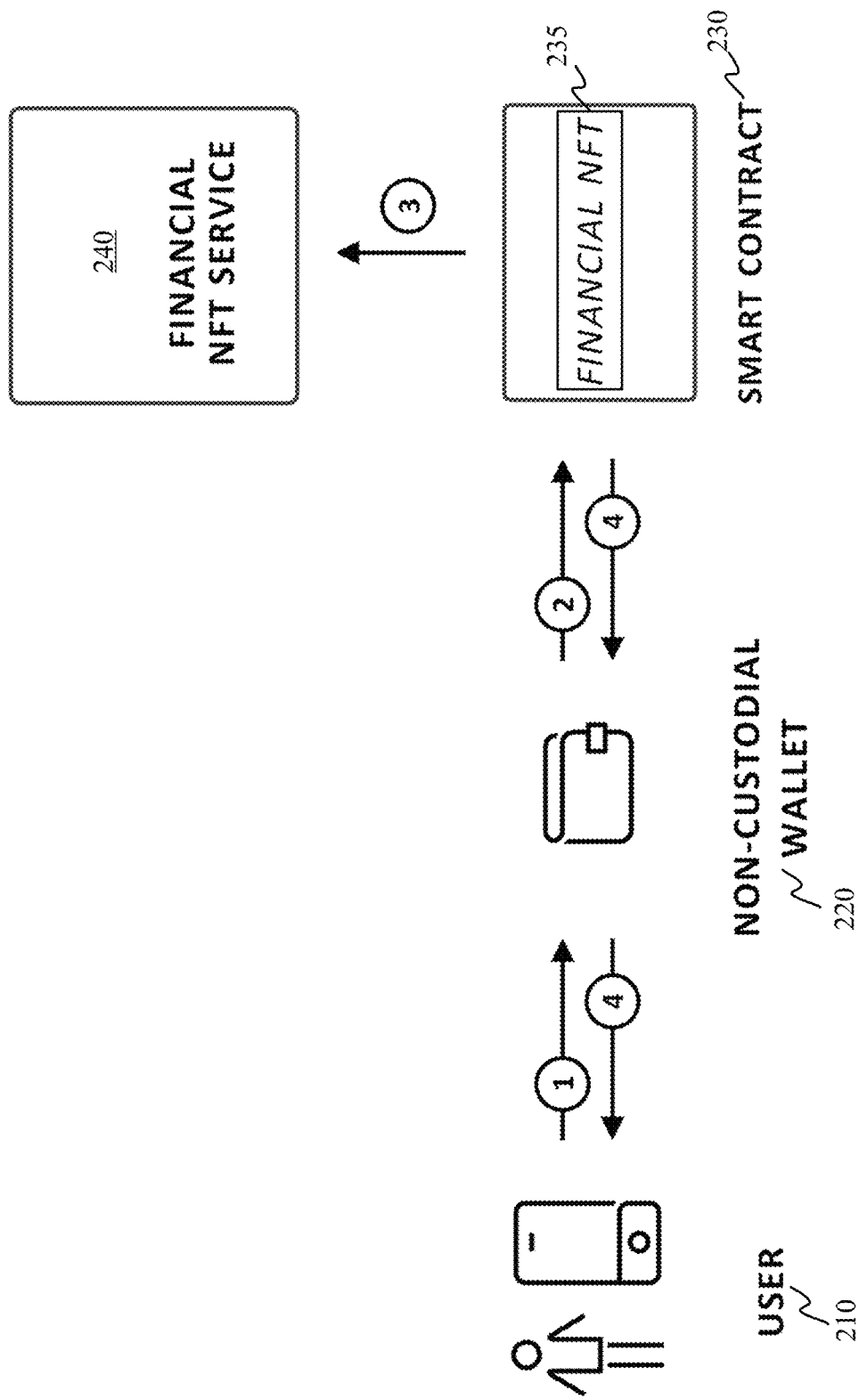
FIG. 2A illustrates an example operating environment and signal flow for digitization of a payment card as a financial NFT for Web3 and metaverse transactions according to an embodiment of the invention.
Figure 2B:
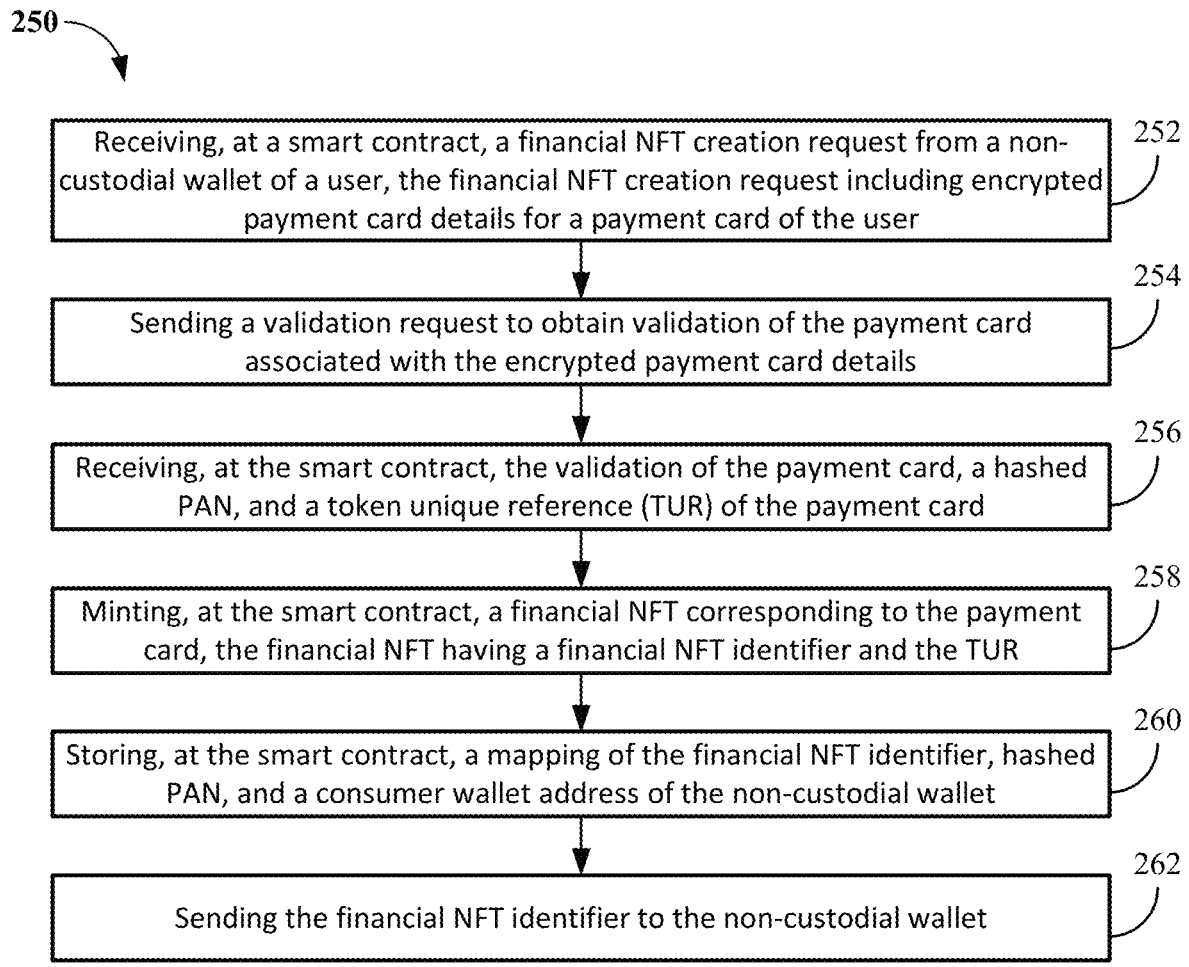
FIG. 2B illustrates a process of tokenizing a payment card at a smart contract.

Referring to FIG. 1, a user can communicate with the user wallet 105 to mint a financial NFT, which may be stored at the user wallet 105, such as described with respect to FIGS. 2A-2B. The user can communicate with the user wallet 105 to initiate an online transaction (e.g., with Web3/Metaverse merchant server 110), such as described with respect to FIGS. 4-8, or to initiate a transaction at a card reader 130, such as described with respect to FIGS. 12-14.

Figure 3:
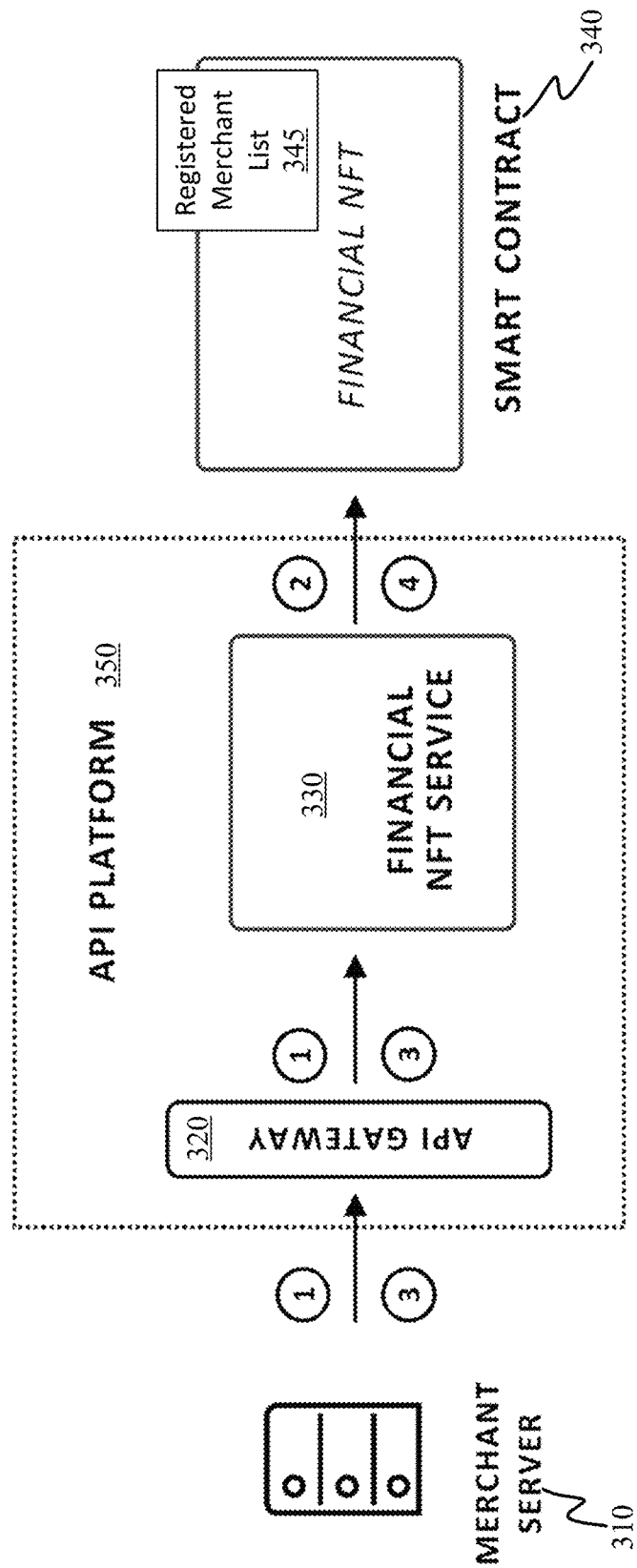
FIG. 3 illustrates an example operating environment and signal flow for merchant onboarding according to an embodiment of the invention.

The Web3/Metaverse merchant server 110 can communicate with the financial NFT service 115, for example, to onboard a merchant ID or merchant address mapping to add the registered merchant list at the financial NFT smart contract 120, as described with respect to FIG. 3.

Through the described use cases, it can be seen that a payment card typically used over a payment network 140 can be transformed into a financial NFT for use in Web3/Metaverse.

Components (computing systems, storage resources, and the like) in the operating environment may operate on or in communication with each other over a network (not shown). The network can be, but is not limited to, a cellular network (e.g., wireless phone), a point-to-point dial up connection, a satellite network, the Internet, a local area network (LAN), a wide area network (WAN), a Wi-Fi network, an ad hoc network or a combination thereof. Such networks are widely used to connect various types of network elements, such as hubs, bridges, routers, switches, servers, and gateways. The network may include one or more connected networks (e.g., a multi-network environment) including public networks, such as the Internet, and/or private networks such as a secure enterprise private network. Access to the network may be provided via one or more wired or wireless access networks as understood by those skilled in the art.

Communication to and from the components may be carried out, in some cases, via application programming interfaces (APIs). An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. The API is generally a set of programming instructions and standards for enabling two or more applications to communicate with each other and is commonly implemented over the Internet as a set of Hypertext Transfer Protocol (HTTP) request messages and a specified format or structure for response messages according to a REST (Representational state transfer) or SOAP (Simple Object Access Protocol) architecture.

FIG. 2A illustrates an example operating environment and signal flow for digitization of a payment card as a financial NFT for Web3 and metaverse transactions according to an embodiment of the invention. Referring to FIG. 2A, an example operating environment can include a user 210, a crypto wallet 220, one or more financial NFT services (e.g., financial NFT service 240), a financial NFT smart contract 230, and a financial NFT 235. FIG. 2B illustrates a process of tokenizing a payment card at a smart contract (e.g., financial NFT smart contract 230).

The described digitization of the payment card is similar to "Click to Pay/Secure Remote Commerce (SRC)" and results in a financial NFT containing a token unique reference (TUR). "Click to Pay/SRC" is a password-free checkout option built on EMV standards.

The described digitization/tokenization of the payment card differs from the current Web3 way of minting an NFT from a previously deployed smart contract. Referring to FIGS. 2A and 2B, to begin the signal flow for digitization of a payment card as a financial NFT for Web3 and metaverse transactions, a user 210 can add payment card details (e.g., credit card, debit card, etc.) to the crypto wallet 220 (e.g., non-custodial), as shown in Step 1. In some cases, the user 210 electronically signs when entering payment card details. The crypto wallet 220 can encrypt the payment card details and submit a financial NFT creation request to the financial NFT smart contract 230, as shown in Step 2. In some cases, the payment card details are encrypted with a financial NFT public key.

Process 250 can occur at a smart contract (e.g., financial NFT smart contract 230) on a blockchain. As described herein, a reference to a smart contract refers to both the code and the underlying hardware executing the code.

In operation 252, the financial NFT smart contract 230 can receive the financial NFT creation request from the crypto wallet 220. The financial NFT creation request can include the encrypted payment card details for the payment card of the user 210.

The financial NFT smart contract 230 can communicate with the financial NFT service 240, for example, via an oracle, to validate the payment card details of the user 210, as shown in Step 3. An oracle refers to entities (e.g., data feeds) in the blockchain network that allow access to external data. A smart contract (e.g., the financial NFT smart contract 230) can only access data within the blockchain network. However, use of an oracle allows the smart contract to access data that is off the blockchain network (i.e., off-chain) and put that data on the blockchain (i.e., on-chain) for the smart contract to use. For example, an oracle may facilitate access to payment authorization results from a card payment network.

In operation 254, the financial NFT smart contract 230 can send a validation request to obtain validation of the payment card associated with the encrypted payment card details. In some cases, the financial NFT service 240 may send a One-Time Passcode Verification (OTP) to the cardholder to perform validation. The financial NFT service 240 can create a hashed PAN and a token unique reference (TUR). The TUR can be a token metadata uniform resource identifier (URI). The TUR represents a tokenized version of the payment card and can be generated at the payment network corresponding to the payment card. The TUR can be used by the payment network to identify the tokenized version of the payment card.

In operation 256, the financial NFT smart contract 230 receives the validation of the payment card, the hashed PAN, the TUR of the payment card from the financial NFT service 240.

The financial NFT smart contract 230 can publish (e.g., mint) a financial NFT 235 and send a financial NFT identifier back to the crypto wallet 220, as shown in Step 4.

In operation 258, the financial NFT smart contract 230 mints a financial NFT 235 corresponding to the payment card. The financial NFT 235 contains a financial NFT identifier and the TUR. In operation 260, the financial NFT smart contract 230 can store a mapping of the financial NFT identifier, the hashed PAN, and/or consumer wallet address of the crypto wallet 220. In operation 262, the financial NFT smart contract 230 can send the financial NFT identifier to the crypto wallet 220. Each financial NFT includes a unique NFT identifier, a hashed PAN corresponding to the payment card, and the TUR. The financial NFT appears on the blockchain to be owned by the user.

Accordingly, a method is provided that includes receiving (252), at a smart contract, a financial NFT creation request from a non-custodial wallet of a user, the financial NFT creation request including encrypted payment card details for a payment card of the user; sending (254) a validation request to obtain validation of the payment card associated with the encrypted payment card details; receiving (256), at the smart contract, the validation of the payment card, a hashed PAN, and a token unique reference of the payment card; minting (258), at the smart contract, a financial NFT corresponding to the payment card, the financial NFT having a financial NFT identifier (and the token unique reference); storing (260), at the smart contract, a mapping of the financial NFT identifier, hashed personal account number (PAN), token unique reference, and a consumer wallet address of the non-custodial wallet; and sending (262) the financial NFT identifier to the non-custodial wallet.

FIG. 3 illustrates an example operating environment and signal flow for merchant onboarding according to an embodiment of the invention. Referring to FIG. 3, an example operating environment can include a merchant server 310, a payment network API platform 350 having a payment network API gateway 320 and one or more financial NFT services (e.g., financial NFT service 330), and a financial NFT smart contract 340 having a registered merchant list 345.

To begin the signal flow for merchant onboarding, the merchant server 310 can onboard through the payment network API gateway 320 and register to the financial NFT service 330, as shown in Step 1. Then, as depicted in Step 2, the financial NFT service 330 can add merchant's ID or wallet address mapping to the registered merchant list 345 in the financial NFT smart contract 340. In some cases, financial NFT service 330 adds a merchant wallet address to the registered merchant list 345, as shown in optional Step 3. In some cases, the merchant server 310 registers a plurality of wallet addresses for additional devices or additional sub-accounts. A device identification, a sub-account identification, and/or a wallet address mapping is associated with the registered merchant list 345 in the financial NFT smart contract 340, as shown in Step 4.

Figure 4:
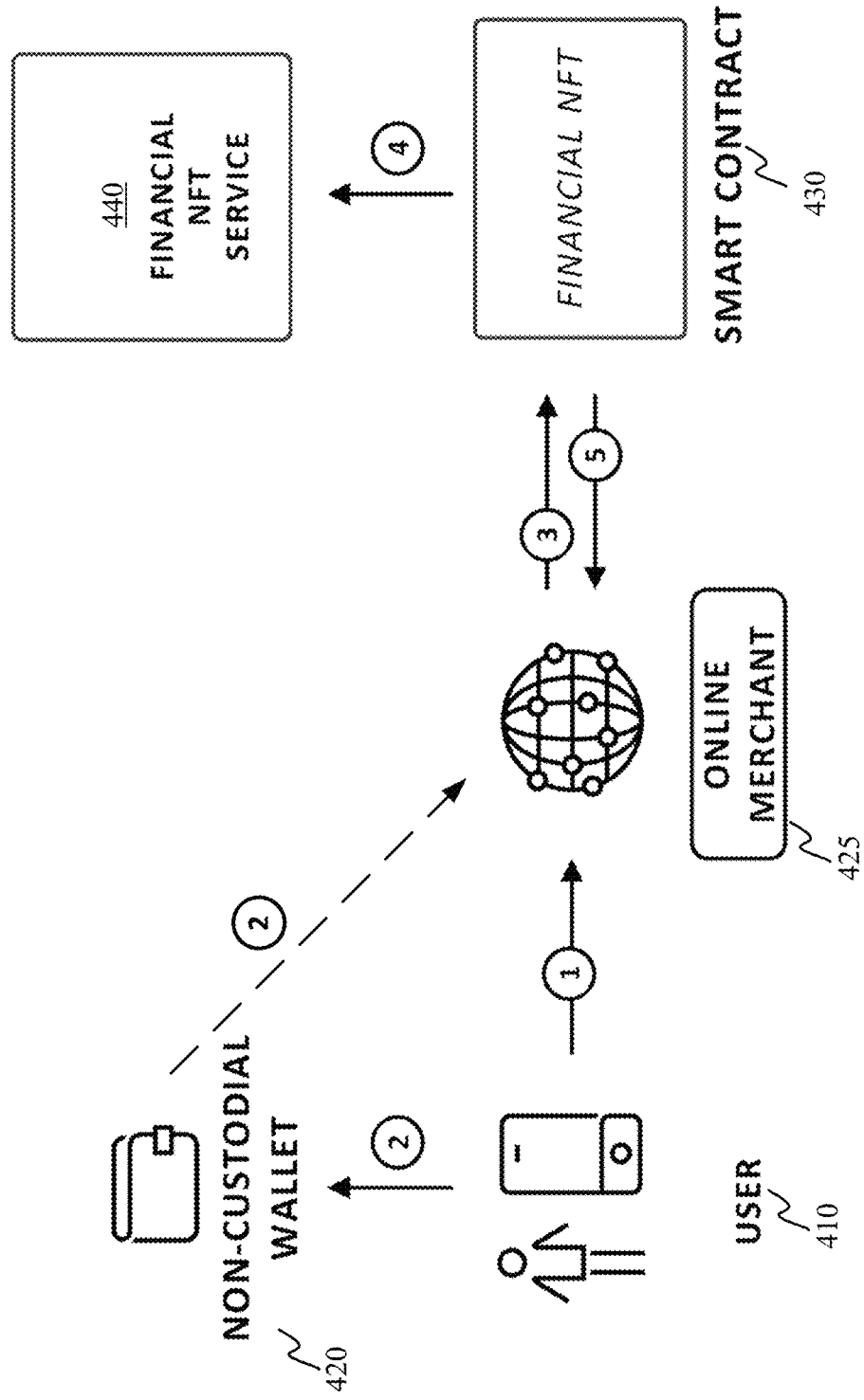
Figure 5:
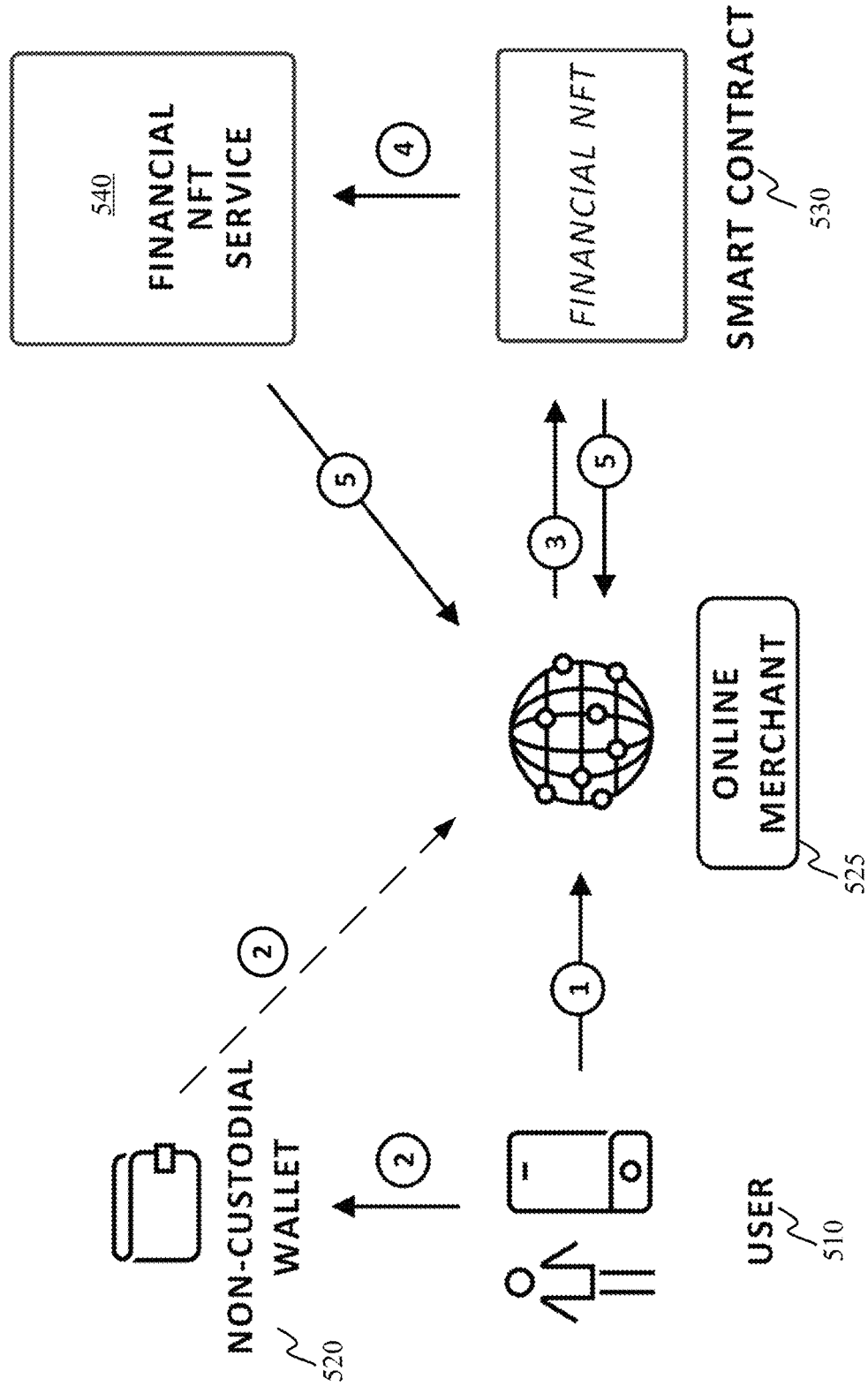
Figure 6A:
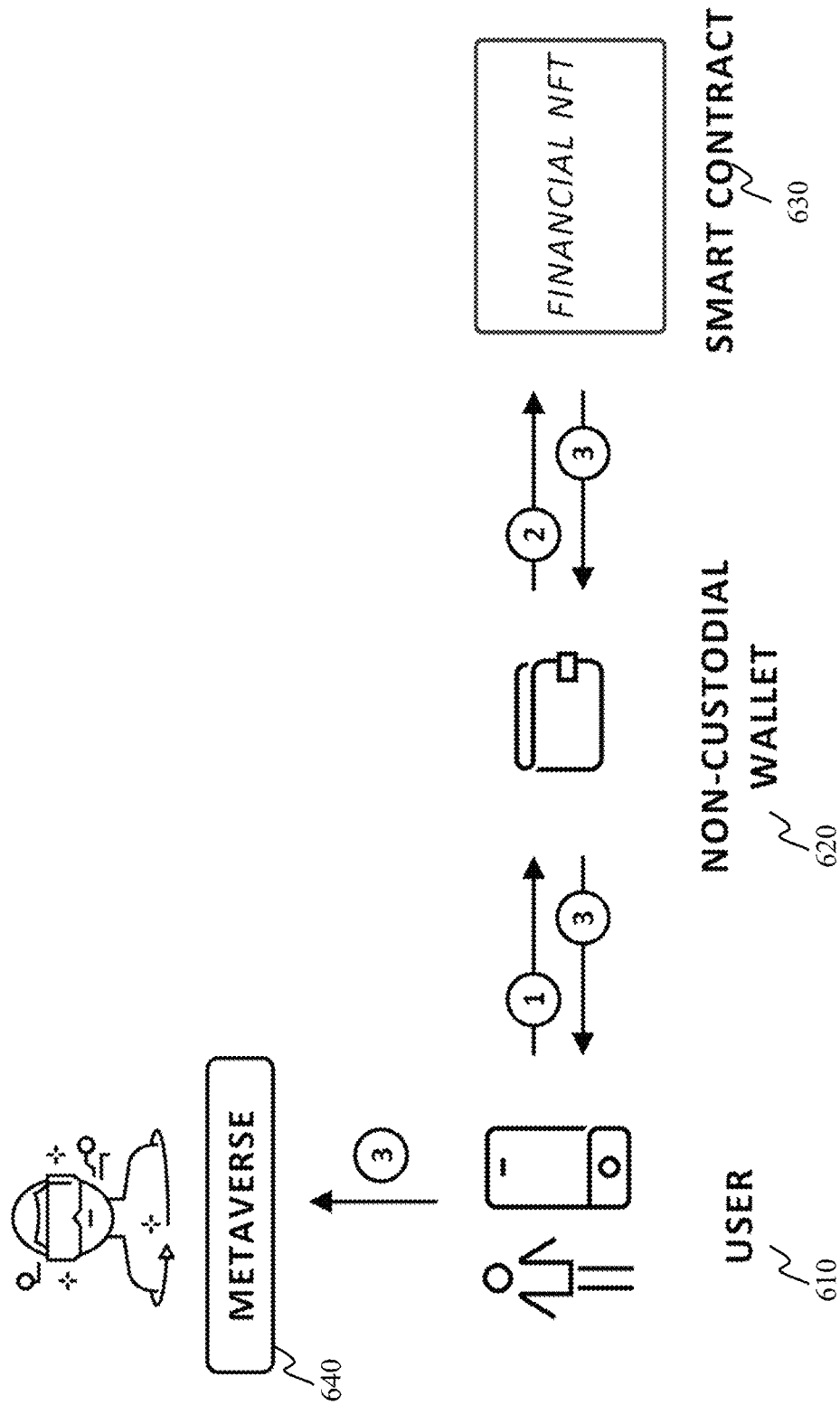
FIG. 6A illustrates a use case for adding a financial NFT card on file (COF) to a merchant or a device.
Figure 6B:
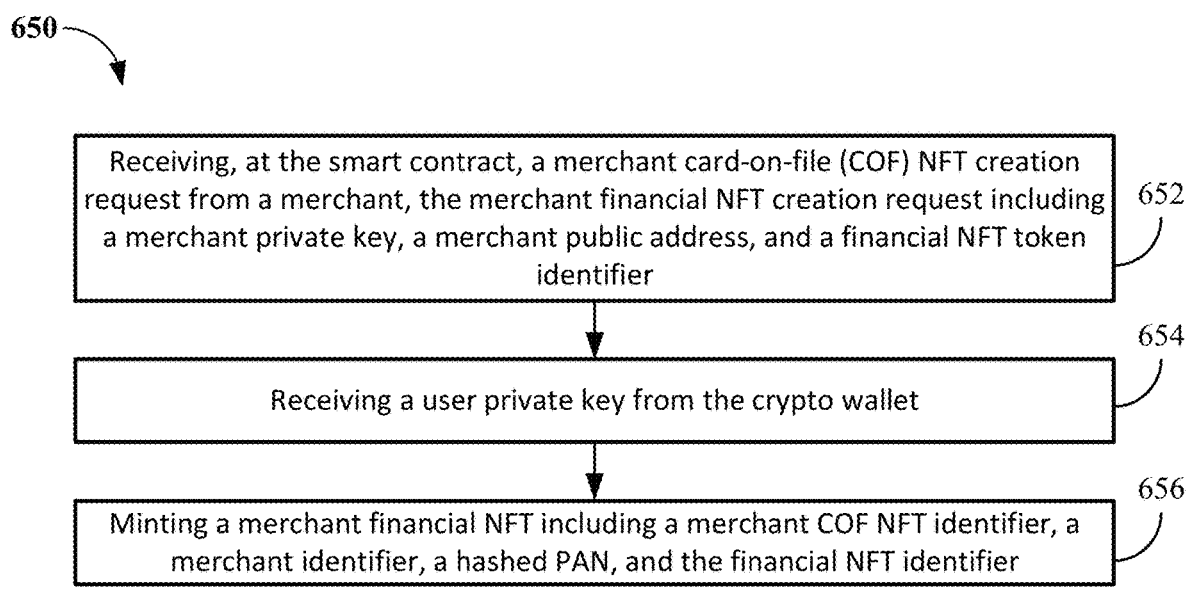
FIG. 6B illustrates an example process of creating a merchant COF NFT.
Figure 7:
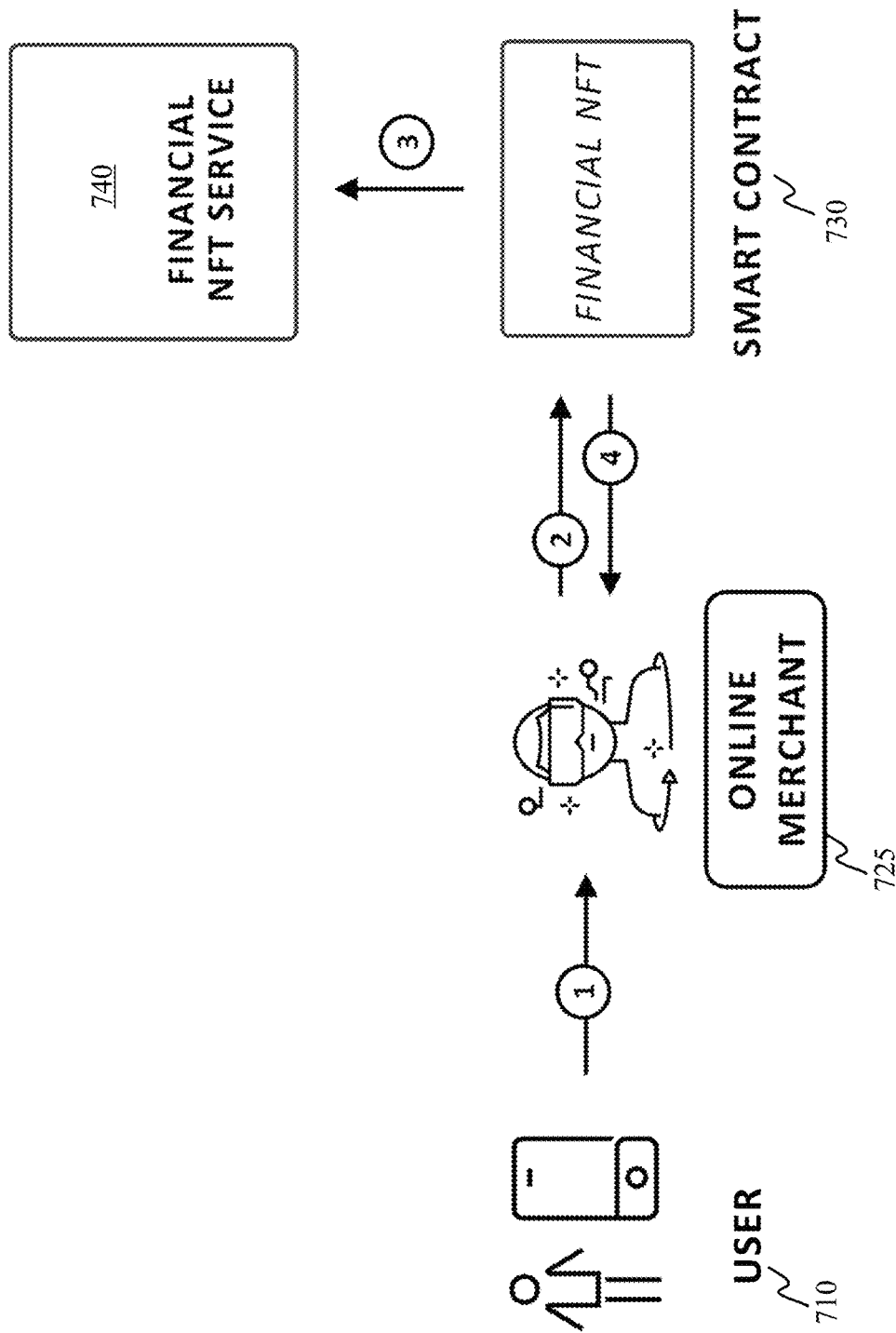
Figure 8:
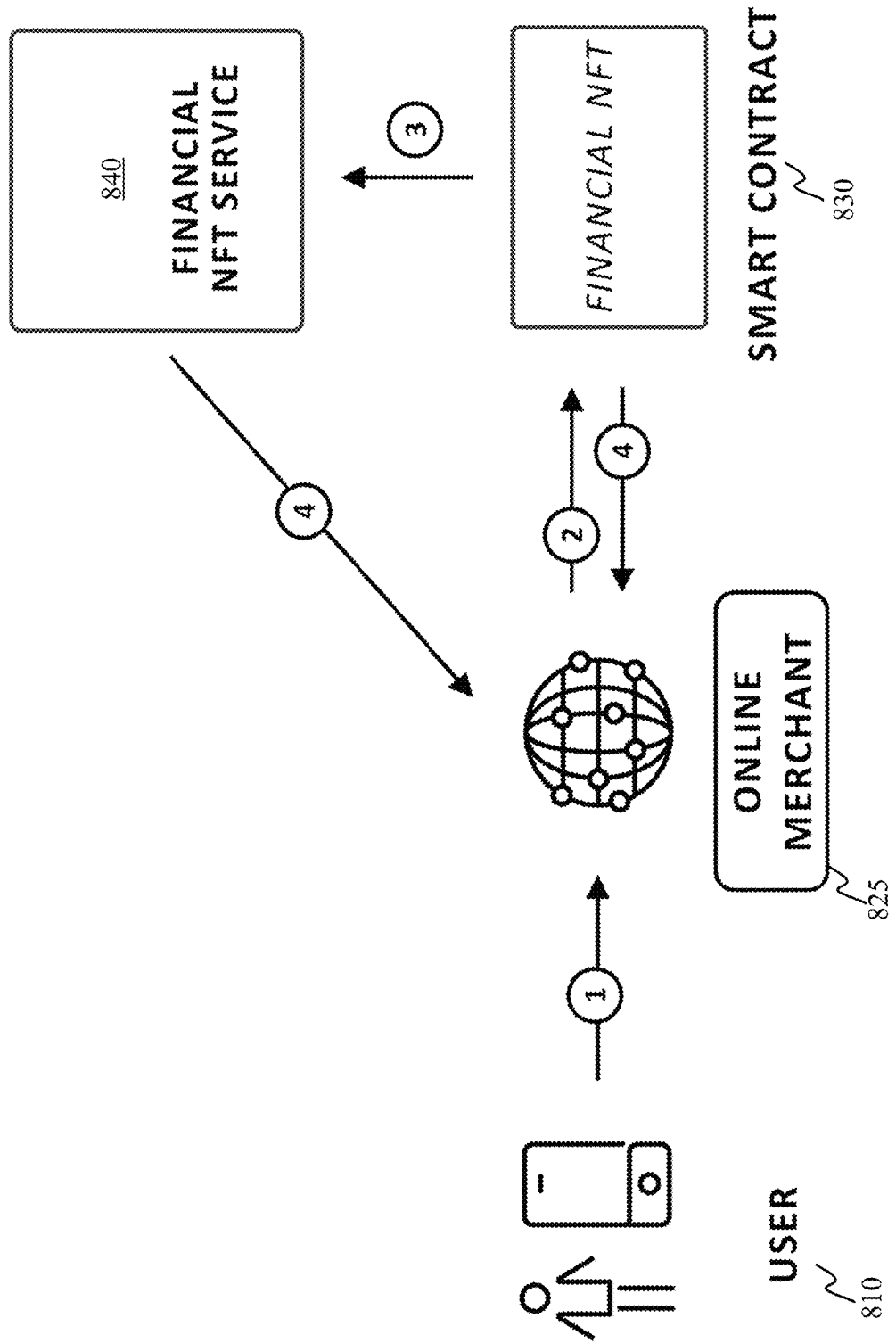

FIGS. 4-8 illustrate example operating environments and signal flows for financial NFT person-to-merchant (P2M) payment transaction use cases according to embodiments of the invention. FIG. 4 illustrates a use case for guest checkout with a financial NFT in Web3; FIG. 5 illustrates a use case for guest checkout with a financial NFT in Web2; FIG. 6 illustrates a use case for adding a financial NFT card on file (COF) to a merchant or a device; FIG. 7 illustrates a use case for a payment made with a financial NFT COF in Web3; and FIG. 8 illustrates a use case for a payment made with a financial NFT COF in Web2.

Referring to FIGS. 4-8, example operating environments can include a user (e.g., user 410, user 510, user 610, user 710, and user 810), a crypto wallet (e.g., crypto wallet 420, crypto wallet 520, and crypto wallet 620), an online merchant (e.g., online merchant 425, online merchant 525, online merchant 725, online merchant 825), one or more financial NFT services (e.g., financial NFT service 440, financial NFT service 540, financial NFT service 740, and financial NFT service 840), and a financial NFT smart contract (e.g., financial NFT smart contract 430, financial NFT smart contract 530, financial NFT smart contract 630, financial NFT smart contract 730, and financial NFT smart contract 830).

Prior to the first step of each of the signal flows for FIGS. 4-8, the user can add a payment card (e.g., a financial NFT) to the crypto wallet (e.g., via process 250 of tokenizing a payment card as described with respect to FIGS. 2A and 2B). The financial NFT includes a unique TUR.

Referring to FIG. 4, to begin the signal flow for the guest checkout with a financial NFT in a Web3 use case, the user 410 begins checkout at a Web3 website/Metaverse of the online merchant 425, as shown in Step 1. The online merchant 425 can be a Web3 native merchant or a merchant in the Metaverse environment.

The user 410 connects the crypto wallet 420 (containing a minted financial NFT) with online merchant 425, as shown in Step 2. To make a payment with the financial NFT, the user 410 provides an electronic signature. The public address of the online merchant 425 and the amount of blockchain value (e.g., crypto) will be passed to a function in the financial NFT along with the electronic signature of the user 410. The output is a transaction hash, which contains a single use, time-bound cryptogram for the TUR. This cryptogram can be exchanged with the payment network/issuer's oracle. In some cases, the exchange involves existing tokenization safety, such as One-Time Passcode Verification (OTP)/3D Secure Verification (3DS), prior to the real-time exchange of fiat to crypto occurs to the address of the online merchant 425.

The online merchant 425 can submit a payment request to the financial NFT smart contract 430, as shown in Step 3. The payment request can include the card transaction details. The financial NFT smart contract 430 can submit the card transaction details to the financial NFT service 440, as shown in Step 4. In some cases, the financial NFT smart contract 430 submits card transaction details to the financial NFT service 440 via oracle. A payment result is sent back to the online merchant 425, as shown in Step 5.

Advantageously, for the illustrative guest checkout with a financial NFT in Web3 use case, only the user 410 needs to sign for each payment transaction.

Referring to FIG. 5 to begin the signal flow for the guest checkout with a financial NFT in Web2 use case, the user 510 begins checkout at a Web2 web site of the online merchant 525, as shown in Step 1. The online merchant 525 can be a Web2 native merchant and accept fiat currency, as opposed to crypto currency.

The user 510 connects the crypto wallet 520 containing a minted financial NFT with online merchant 525, as shown in Step 2. To make a payment with the financial NFT, the user 510 provides an electronic signature. The public address of the online merchant 525, currency code and payment amount can be passed to a function in the financial NFT, along with the electronic signature of the user 510.

The online merchant 525 can submit a payment request to the financial NFT smart contract 530, as shown in Step 3. The financial NFT smart contract 530 can request detokenization of the financial NFT, for example, via an oracle, as shown in Step 4. The detokenized payment card details can be sent back to the online merchant 525, as shown in Step 5. The online merchant 525 can then process the payment as a conventional payment card transaction.

There are multiple options of value transfer in the illustrative guest checkout with a financial NFT in Web2 use case. In some cases, the output of invoking a smart contract function in the financial NFT to make a value transfer adds a smart contract transaction containing hashlock that will be picked up by the financial NFT service 540 (acting as a listener listener). In this case, the output will be processed on existing payment card rails. Upon successful results, value transfer to the merchant is unlocked.

In some cases, the output of invoking a smart contract function in the financial NFT to make a value transfer may be a transaction hash that contains single-use, time-bound cryptogram for the TUR. The TUR can be exchanged with the payment network/issuer's oracle. In some cases, existing tokenization safety, like OTP Verification/3DS before real-time exchange of fiat to crypto occurs to the address of the online merchant 525.

In the illustrative guest checkout with a financial NFT in Web2 use case, the transaction risk on the value transfer lies with the issuer, since the issuer authenticates it on existing card rails. For the illustrative guest checkout with a financial NFT in Web2 use case, only the user 510 needs to sign for each payment transaction.

Referring to FIG. 6A to add a financial NFT card-on-file (COF) to a merchant or a device, a user can visit a Web3/Metaverse website of the online merchant, add the financial NFT, and authorize that financial NFT to be used with this online merchant.

In the illustrative use case of FIG. 6A, to begin the signal flow, the user 610 can sign to add a financial NFT to an online merchant device/metaverse device in the metaverse 640, as shown in Step 1. The user can send an authorization request requesting to authorize the financial NFT with an online merchant device/metaverse device to the financial NFT smart contract 630, via the crypto wallet 620, as shown in Step 2. Authorizing the financial NFT can include storing, at the financial NFT smart contract 630, authorized financial NFT information and an authorization reference. The authorized financial NFT information can include the financial NFT identifier of the financial NFT and a wallet address of the merchant and/or merchant device. The authorized financial NFT information (e.g., the NFT identifier, wallet address of merchant/device, and authorization reference) can be stored in the metaverse 640, as shown in Step 3. Although the illustrative example of FIG. 6A shows the online merchant on the metaverse, the merchant may be on Web3 or even Web2.

In some cases, as illustrated in FIG. 6B, authorizing the financial NFT can include minting a new merchant COF NFT at the financial NFT smart contract 630.

FIG. 6B illustrates an example process of creating a merchant COF NFT. In some cases, a merchant-specific financial NFT (i.e., "merchant COF NFT") can be minted via a smart contract that created a financial NFT corresponding to a payment card (e.g., financial NFT 235 as described with respect to FIG. 2A).

Referring to FIG. 6B, process 650 can begin when the financial NFT smart contract 630 receives (652) a merchant COF NFT request from a merchant (e.g., merchant operating on Web3/Metaverse website). In some cases, the merchant can request a merchant COF NFT by invoking a function on an existing, user-owned financial NFT (e.g., financial NFT 235 as described with respect to FIG. 2A). The merchant COF NFT request may include (and in some cases, require) the user's signature (e.g., the user's private key).

The merchant COF NFT request can include a merchant private key, a merchant public address (e.g., merchant crypto wallet public address), and a financial NFT identifier. In some cases, the merchant can generate the merchant COF NFT request by invoking a function on the user-owned financial NFT corresponding to a payment card, requiring the consumer to sign (e.g., using the user's private key). The merchant COF NFT can be signed by the user's private key and/or the merchant's private key (e.g., multi-sig).

The financial NFT smart contract 630 receives (654) a user private key from the crypto wallet 620. The user private key indicates to the financial NFT smart contract 630 that the user agrees to mint the merchant COF NFT, which will indicate that the merchant has permission to use the financial NFT indicated by the merchant COF NFT (e.g., indicated via the TUR).

Once the financial NFT smart contract 630 receives the user private key, the financial NFT smart contract 630 can mint (656) a merchant COF NFT. The merchant COF NFT can include a merchant COF NFT identifier, a merchant identifier, a hashed PAN (i.e., the user's primary account number), and the TUR. With the signatures of both the merchant and the user, the financial NFT smart contract 630 can use information of the financial NFT stored at the financial NFT smart contract 630 (e.g., user's hashed PAN and TUR) to mint the merchant COF NFT. The merchant COF NFT appears on the blockchain to be owned by the merchant and is signed by the user (as opposed to the financial NFT, which appears on the blockchain to be owned by the user/payment card owner). Advantageously, minting a merchant COF NFT allows the merchant to invoke the merchant COF NFT as a "card-on-file" for transactions made by the user at that specific merchant. As such, the user will be able to perform fast checkouts at Web3/metaverse merchants with their merchant COF NFT (akin to if their payment card was stored on file in the case of a Web2 merchant).

Referring to FIG. 7, to use the financial NFT as a COF (or similarly, to use a merchant COF NFT), the online merchant 725 can invoke a "makePayment" function of the financial NFT COF by passing the public address of the online merchant 725 and amount of blockchain value (crypto), as well as a signature. This will generate a unique cryptogram, which along with the TUR, may be used for traditional card payment processing to complete the payment transaction, for example via BankNet/ISO8583.

To begin the signal flow for an illustrative financial NFT COF payment in Web3 use case, the user 710 can select a financial COF NFT from NFT list stored at the online merchant 725 (e.g., a merchant COF NFT) and confirm to pay, as shown in Step 1. The online merchant 725 can use a private key to sign and submit the transaction, as shown in step 2. In some cases, the online merchant 725 is located within the metaverse. In some cases, the online merchant 725 is located on Web3. The transaction details may include a financial NFT identifier, an authentication reference, and/or transaction amount.

The financial NFT smart contract 730 can submit a payment card transaction, for example, via an oracle, as shown in Step 3. The payment result can then be sent back to the online merchant 725, as shown in Step 4.

There are multiple options of value transfer in the illustrative merchant COF NFT payment in Web3 use case. In some cases, the output of invoking a smart contract function in the financial NFT to make a value transfer adds a smart contract transaction containing hashlock that will be picked by the financial NFT service 740 (acting as a listener listener). The "output" is processed on existing payment card rails, and upon a successful result, unlocks value transfer to the online merchant 725.

In some cases, the output of invoking a smart contract function in the financial NFT to make a value transfer will be transaction hash that contains single use, time-bound cryptogram for the TUR which can be exchanged with the payment network/Issuer's oracle and may optionally involve existing tokenization safety like OTP Verification/3DS before real-time exchange of fiat to crypto occurs to the address of the online merchant 725.

Referring to FIG. 8 to begin the signal flow for the payment made with a financial NFT COF in Web2 use case, the user 810 can begin checkout at online merchant 825, where the online merchant 825 is a Web2 native merchant, as shown in Step 1. The user 810 can select click-to-pay/financial NFT from a stored NFT list and confirm to pay. The online merchant 825 can use private key to sign and submit the payment transaction, as shown in Step 2. The payment transaction details may include a financial NFT identifier, authentication reference, and/or transaction amount. The financial NFT smart contract 830 can request detokenization, for example, via an oracle, as shown in Step 3. The detokenized payment card details can then be sent back to the online merchant 825, as shown in 4. The online merchant 825 can then process the payment as a conventional payment card transaction.

There are multiple options of value transfer in the illustrative financial NFT COF payment in Web2 use case. In some cases, the output of invoking a smart contract function in the financial NFT to make a value transfer adds a smart contract transaction containing hashlock that will be picked up by the financial NFT service 840 (acting as a listener listener). In this case, the output will be processed on existing payment card rails. Upon successful results, value transfer to the online merchant 825 is unlocked.

In some cases, the output of invoking a smart contract function in the financial NFT to make a value transfer will be a transaction hash that contains single-use, time-bound cryptogram for the TUR. The TUR can be exchanged with the payment network/Issuer's oracle. In some cases, existing tokenization safety, like OTP Verification/3DS before real-time exchange of fiat-to-crypto occurs to the address of the online merchant 825.

In the illustrative use case, the transaction risk on the value transfer lies with the issuer, since the issuer authenticates the transaction on existing payment card rails.

For COF use cases, only the online merchant 825 needs to sign for each payment transaction and the user 810 needs to sign during the tokenization process.

Figure 9:
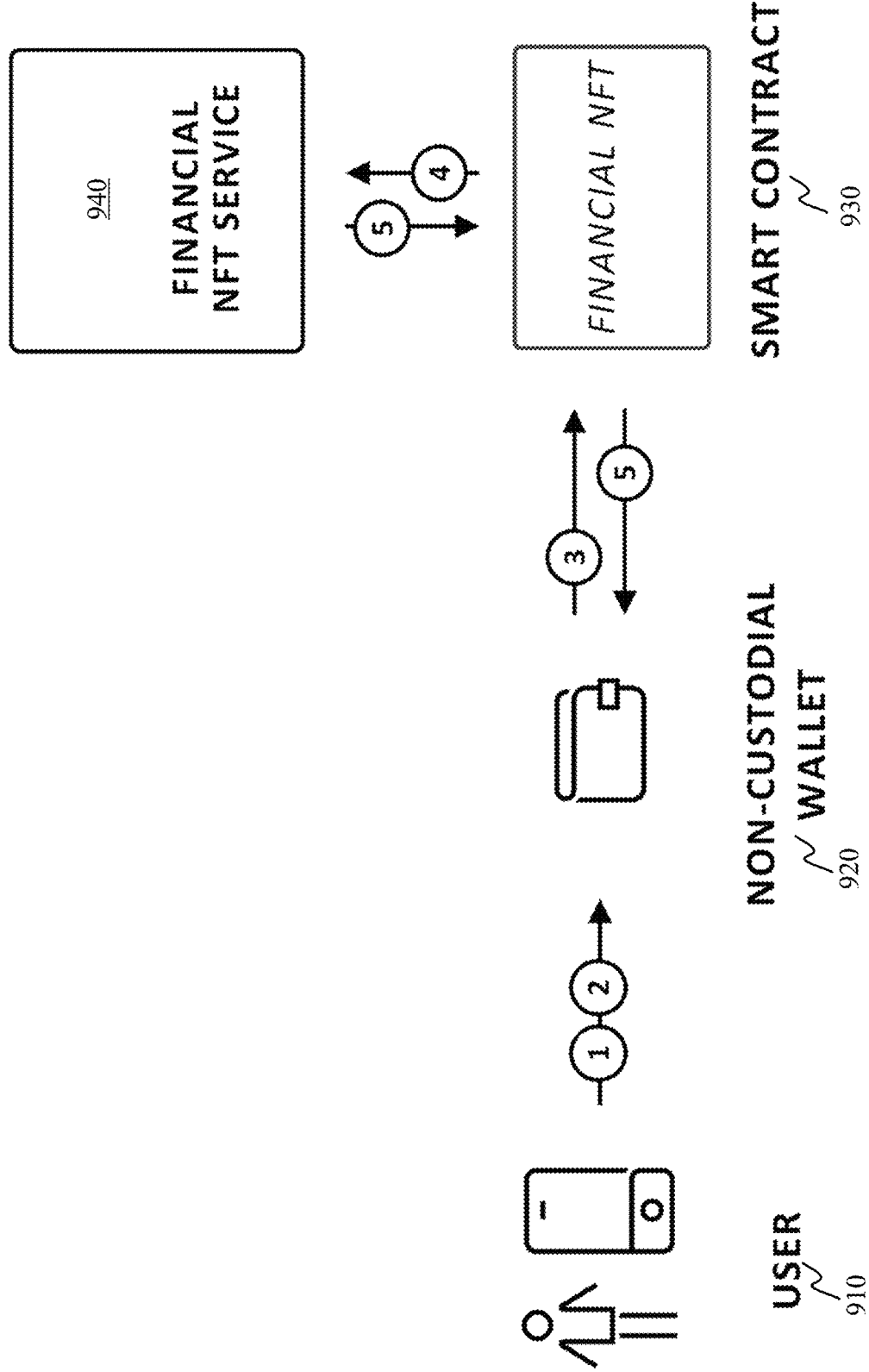
FIGS. 9-11 illustrate example operating environments and signal flows for financial NFT person-to-person (P2P) payment transaction use cases according to embodiments of the invention.
Figure 10:
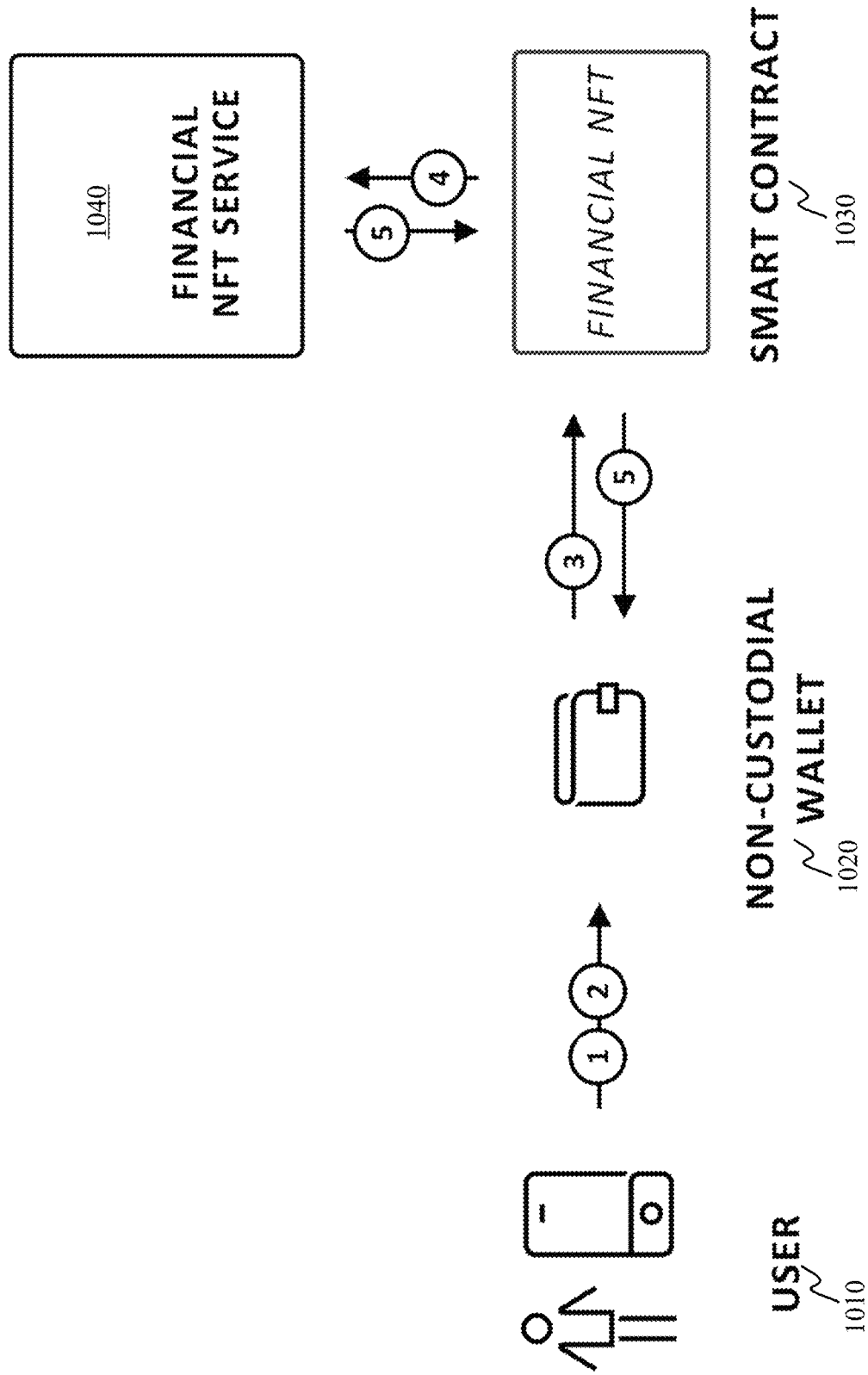
Figure 11:
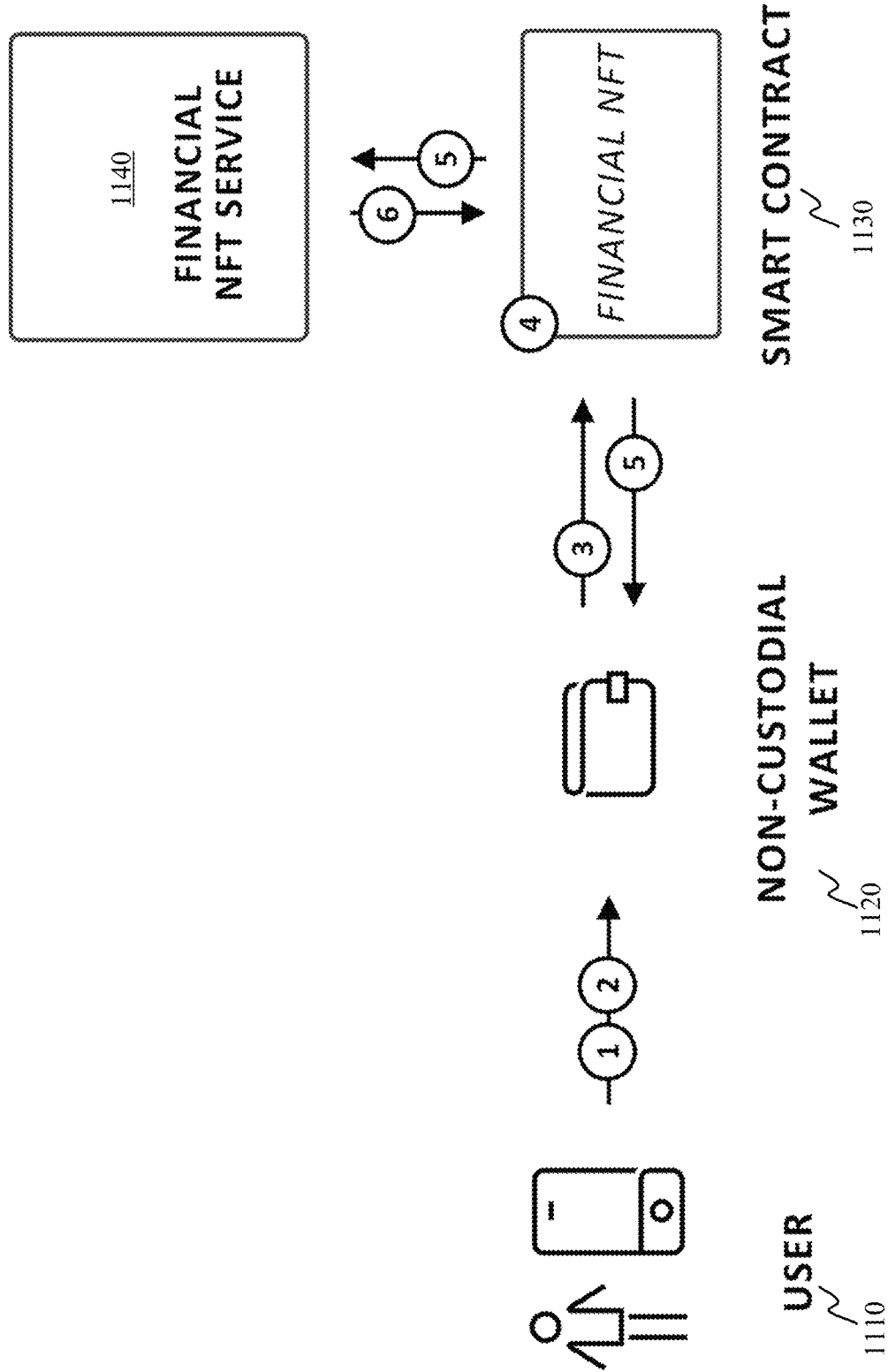

FIGS. 9-11 illustrate example operating environments and signal flows for financial NFT P2P payment transaction use cases according to embodiments of the invention. FIG. 9 illustrates a fiat-to-fiat use case; FIG. 10 illustrates a fiat-to-crypto use case; and FIG. 11 illustrates a crypto-to-crypto use case.

Referring to FIGS. 9-11, example operating environments can include a user (e.g., first user 910, first user 1010, and first user 1110), a crypto wallet (e.g., crypto wallet 920, crypto wallet 1020, and crypto wallet 1120), one or more financial NFT services (e.g., financial NFT service 940, financial NFT service 1040, and financial NFT service 1140), and a financial NFT smart contract (e.g., financial NFT smart contract 930, financial NFT smart contract 1030, and financial NFT smart contract 1130).

Prior to the first step of each of the signal flows for FIGS. 9-11, the user can add a payment card to the crypto wallet. Adding the payment card to the crypto wallet can involve tokenization (e.g., the digitization described with respect to FIG. 3) and results in a financial NFT containing a TUR.

Referring to FIG. 9, to begin the signal flow for the fiat-to-fiat P2P payment with financial NFT use case, a first user 910 can select a financial NFT as a funding source and then enter receiving NFT identification of a second user (not shown), and transaction amount, as shown in Step 1. The first user 910 may provide an electronic signature to initiate the P2P payment transaction, as shown in Step 2. The crypto wallet 920 can submit a P2P payment request to the financial NFT smart contract 930, as shown in Step 3. The financial NFT smart contract 930 can submit payment card transaction details to the financial NFT service 940, for example, via oracle, as shown in Step 4. The P2P payment result can then be sent back to the crypto wallet 920, as shown in Step 5.

Referring to FIG. 10, to begin the signal flow for the fiat-to-crypto P2P payment with financial NFT use case, the first user 1010 can select a financial NFT as a funding source and then enter the receiving crypto wallet address of a second user (not shown) and P2P payment transaction amount, as shown in Step 1. The first user 1010 can provide an electronic signature to initiate the P2P payment transaction, as shown in Step 2. The crypto wallet 1020 can submit a P2P payment request to the financial NFT smart contract 1030, as shown in Step 3. The financial NFT smart contract 1030 can submit payment card transaction information to the financial NFT service 1040, for example, via oracle, as shown in Step 4. The P2P payment result can then be sent back to the crypto wallet 1020, as shown in Step 5.

Referring to FIG. 11, to begin the signal flow for the crypto-to-crypto P2P payment with financial NFT use case, the first user 1010 can select a crypto balance as a funding source and then enter receiving NFT identification of a second user (not shown) and a transaction amount, as shown in Step 1. The first user 1010 can provide an electronic signature to initiate the P2P payment transaction, as shown in Step 2. The crypto wallet 1020 can submit a P2P payment request to the financial NFT smart contract 930, as shown in Step 3. The financial NFT smart contract 930 can receive the crypto payment, as shown in Step 4. The financial NFT smart contract 1030 can submit payment card transaction information, for example, via an oracle, as shown in Step 5. The P2P payment result may then be sent back to crypto wallet 1020, as shown in Step 6.

Figure 12:
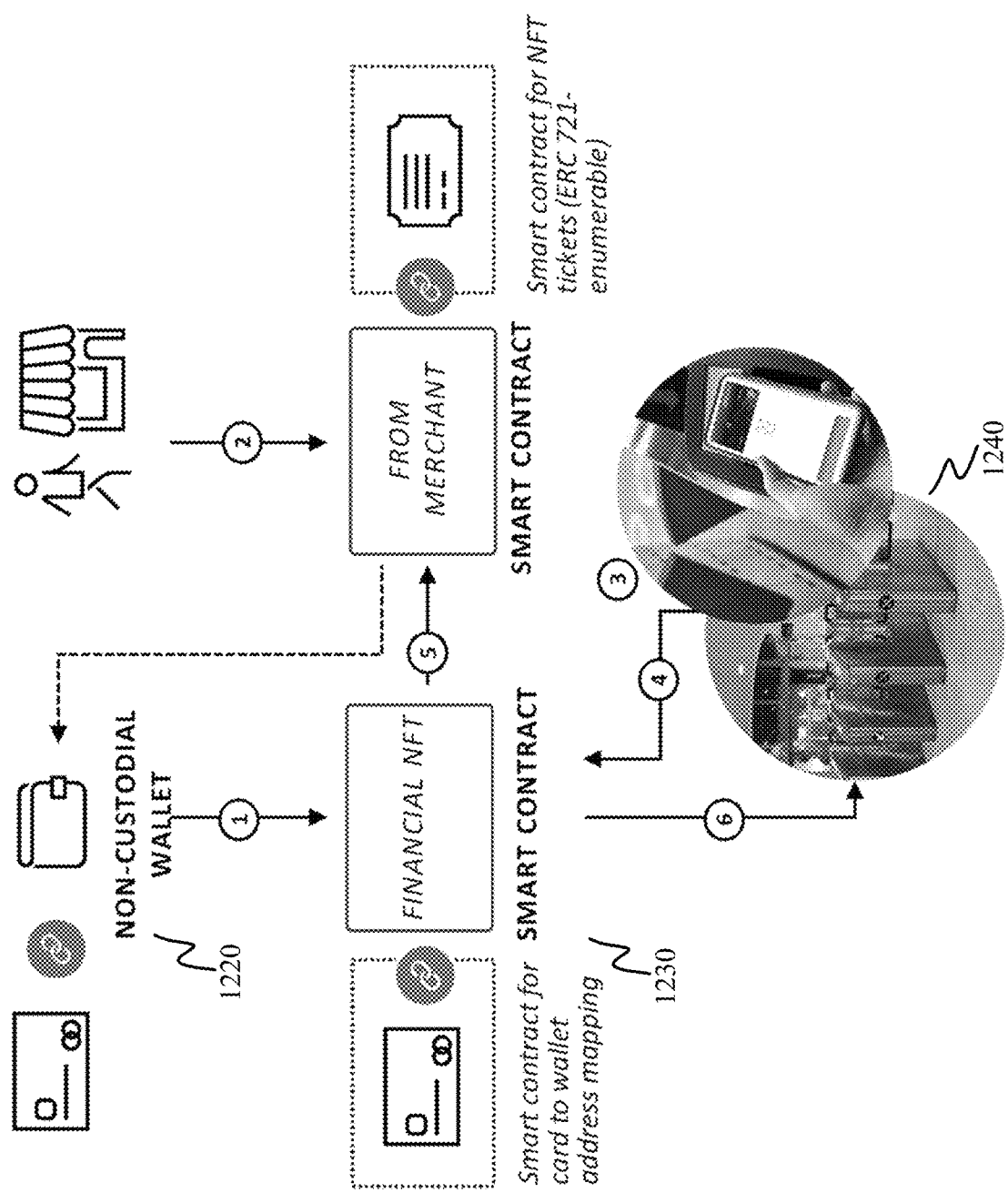
FIGS. 12-14 illustrate example operating environments and signal flows for associating a financial NFT to enable value-added services use cases according to embodiments of the invention.
Figure 13:
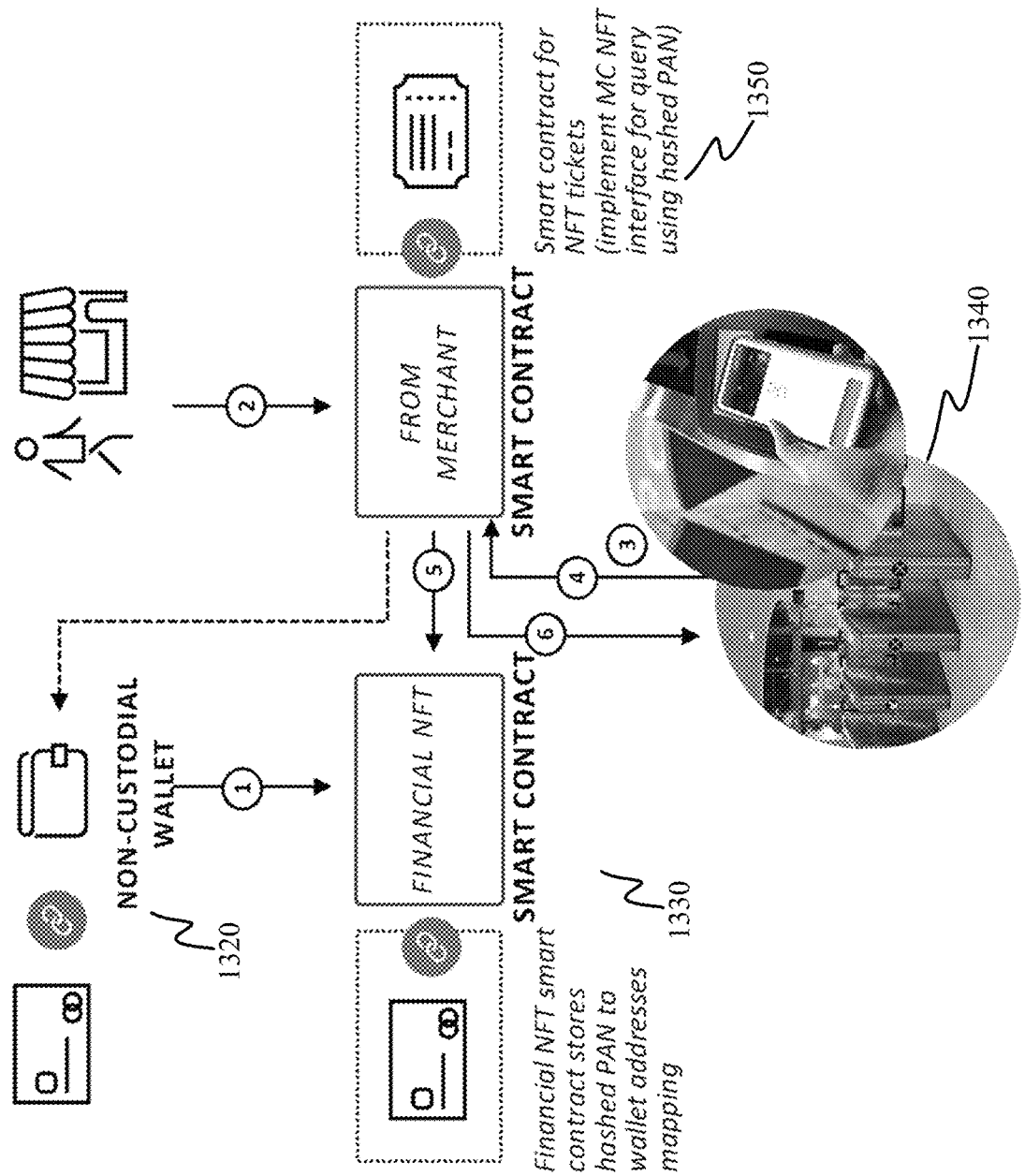
Figure 14:
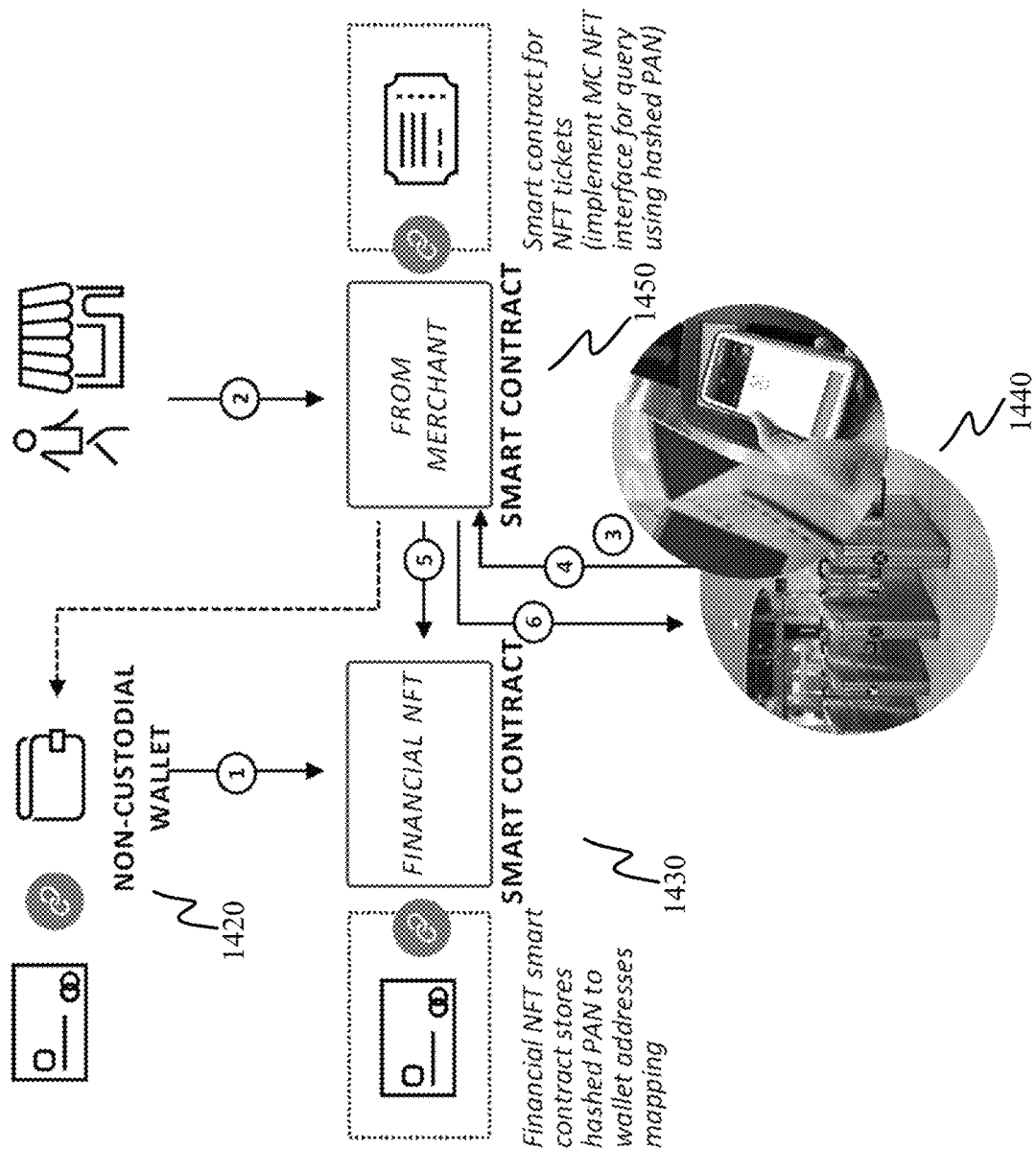

FIGS. 12-14 illustrate example operating environments and signal flows for associating a financial NFT to enable value-added services use cases according to embodiments of the invention.

Referring to FIG. 12, a user can associate a card (hashed PAN) as a financial NFT with crypto wallet 1220 in a financial NFT smart contract 1230, as shown in Step 1. The financial NFT smart contract 1230 is for payment card to crypto wallet address mapping. The user can then purchase a ticket as an NFT from a merchant, as shown in Step 2.

When the user is ready to use the ticket, the user can tap the payment card or crypto wallet on a card reader 1240, such as a gantry, as shown in Step 3. The card reader 1240 can ask the financial NFT smart contract 1230 for NFT tickets mapped to payment cards by providing hashed PAN and a ticket contract address, as shown in Step 4. The financial NFT smart contract 1230 looks for ticket(s) owned by the wallet address of the crypto wallet 1220, as shown in Step 5. The financial NFT smart contract 1230 can then return a list of tickets owned by card owner to the card reader 1240 and the card reader 1240 can check the list of tickets and allow entry, as shown in Step 6.

Referring to FIG. 13, a user can associate a card (hashed PAN) as a financial NFT with crypto wallet 1320 in a financial NFT smart contract 1330, as shown in Step 1. The financial NFT smart contract 1330 is for a payment card to crypto wallet address mapping. The user can then purchase a ticket as an NFT from a merchant, as shown in Step 2.

When the user is ready to use the ticket, the user can tap the crypto wallet on a card reader 1340, such as a gantry, as shown in Step 3. The card reader 1340 can ask a ticket NFT smart contract 1350 for NFT tickets mapped to payment cards by providing hashed PAN, as shown in Step 4. The ticket NFT contract calls the financial NFT smart contract 1330 with hashed PAN to find the mapped wallet address, as shown in Step 5. The financial NFT smart contract 1330 finds ticket NFTs owned by the wallet address of the crypto wallet 1320 returned in Step 5 and returns a list of tickets owned by the card owner, as shown in Step 6. The card reader 1340 can then check tickets and allow entry.

Referring to FIG. 14, a user can associate a card (hashed PAN) as a financial NFT with crypto wallet 1420 in a financial NFT smart contract 1430, as shown in Step 1. The financial NFT smart contract 1430 is for a payment card to crypto wallet address mapping. The user can then purchase a ticket as an NFT from a merchant, as shown in Step 2.

When the user is ready to use the ticket, the user can tap the crypto wallet 1420 on a card reader 1440, such as a gantry, as shown in Step 3. The card reader 1440 can call the financial NFT smart contract 1430 with a hashed PAN to find the mapped wallet address(es), as shown in Step 4. The card reader 1440 can ask the ticket NFT smart contract 1450 for NFT tickets owned by the wallet address of the crypto wallet 1420 and verify the tickets and allow entry, as shown in Step 5.

Figure 15:
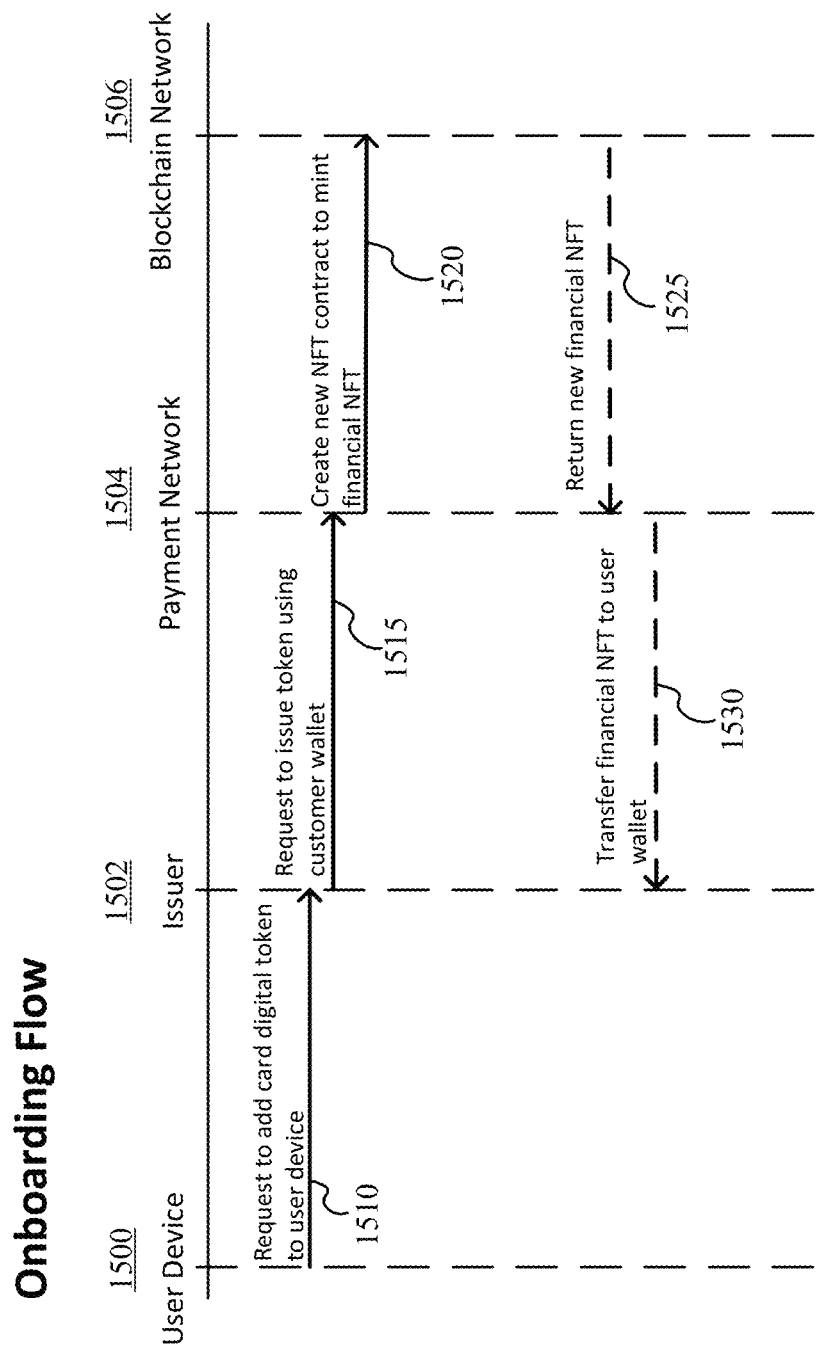
FIG. 15 illustrates an example sequence diagram for an onboarding flow for onboarding a payment card for making payments inside a metaverse environment according to an embodiment of the invention.
Figure 16:
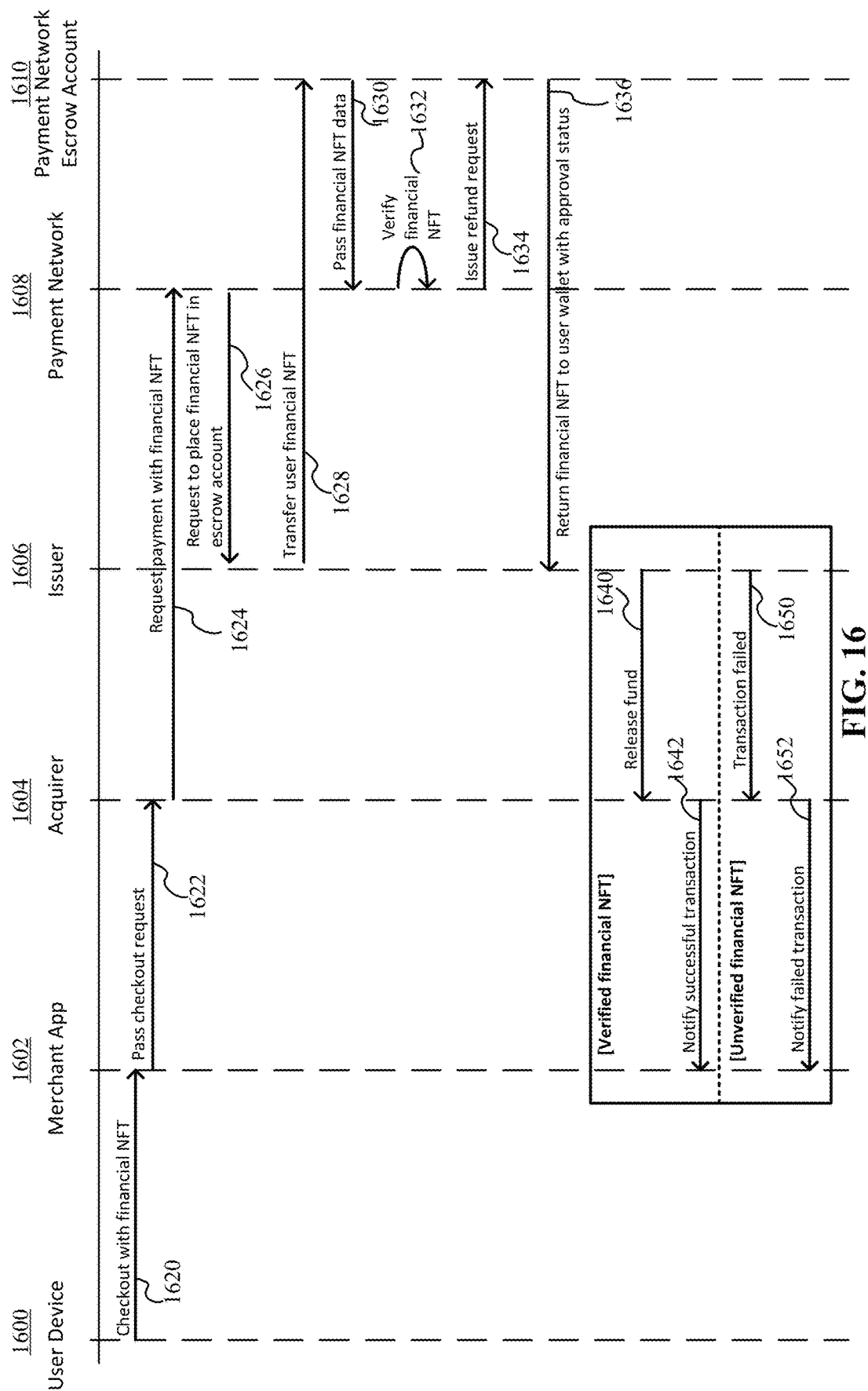
FIG. 16 illustrates an example sequence diagram for a payment flow for making payments inside a metaverse environment

FIG. 15 illustrates an example sequence diagram for an onboarding flow for onboarding a payment card for making payments inside a metaverse environment according to an embodiment of the invention; and FIG. 16 illustrates an example sequence diagram for a payment flow for making payments inside a metaverse environment. With a financial NFT as a payment token, users can easily onboard their card to the blockchain and utilize it whenever needed.

Referring to FIG. 15, a user 1500 can request (1510) to onboard their card to the metaverse blockchain. The request is sent to an issuer 1502 who is hosting the user wallet. The issuer 1502 can send (1515) request to a payment network 1504 for the NFT issuance. The payment network 1504 can create (1520) a new NFT smart contract to mint the NFT on the respective blockchain network 1506 and return the newly minted NFT as a payment token. Here, the blockchain network 1506 can return (1525) the new financial NFT to the payment network 1504; and the payment network 1504 can transfer (1530) the financial NFT to the user wallet hosted by the issuer 1502. If the mapping of the card to financial NFT of the respective blockchain is not found, the payment network 1504 can mint a new financial NFT payment token on that blockchain. This token then saved in the user wallet that hosted by issuer 1502.

Referring to FIG. 16, a user 1600 can checkout (1620) with a financial NFT at a merchant application 1602 in the Metaverse world by representing the token id to the merchant application 1602. The merchant application 1602 can then contact an acquirer 1604 to request (1622) for the payment. The acquirer 1604 can then contact a payment network 1608 to request (1624) for the payment with the financial NFT payment token. The payment network 1608 can route the request to an issuer 1606 and ask (1626) the issuer 1606 to transfer (1628) the financial NFT payment token in user wallet to a payment network escrow account 1610. The payment network escrow account 1610 can pass (1630) the financial NFT data to the payment network 1608 and the payment network 1608 can process the financial NFT verification (1632).

Upon finishing the verification, the payment network 1608 can return the verification result to issuer 1606 and then issue (1634) the refund request so that the financial NFT payment token is transferred (1636) from the payment network escrow account 1610 back to user wallet hosted by the issuer 1606.

Based on the verification outcomes, the issuer 1606 makes the respective decision to release the funds. If the financial NFT is verified, the issuer 1606 can release (1640) the funds to the acquirer 1604 and the acquirer 1604 can notify (1642) the merchant application 1602 of a successful transaction. If the financial NFT is unverified, the issuer 1606 can communicate (1650) to the acquirer 1604 that the transaction failed and the acquirer 1604 can notify (1652) the merchant application 1602 of a failed transaction.

Figure 17:
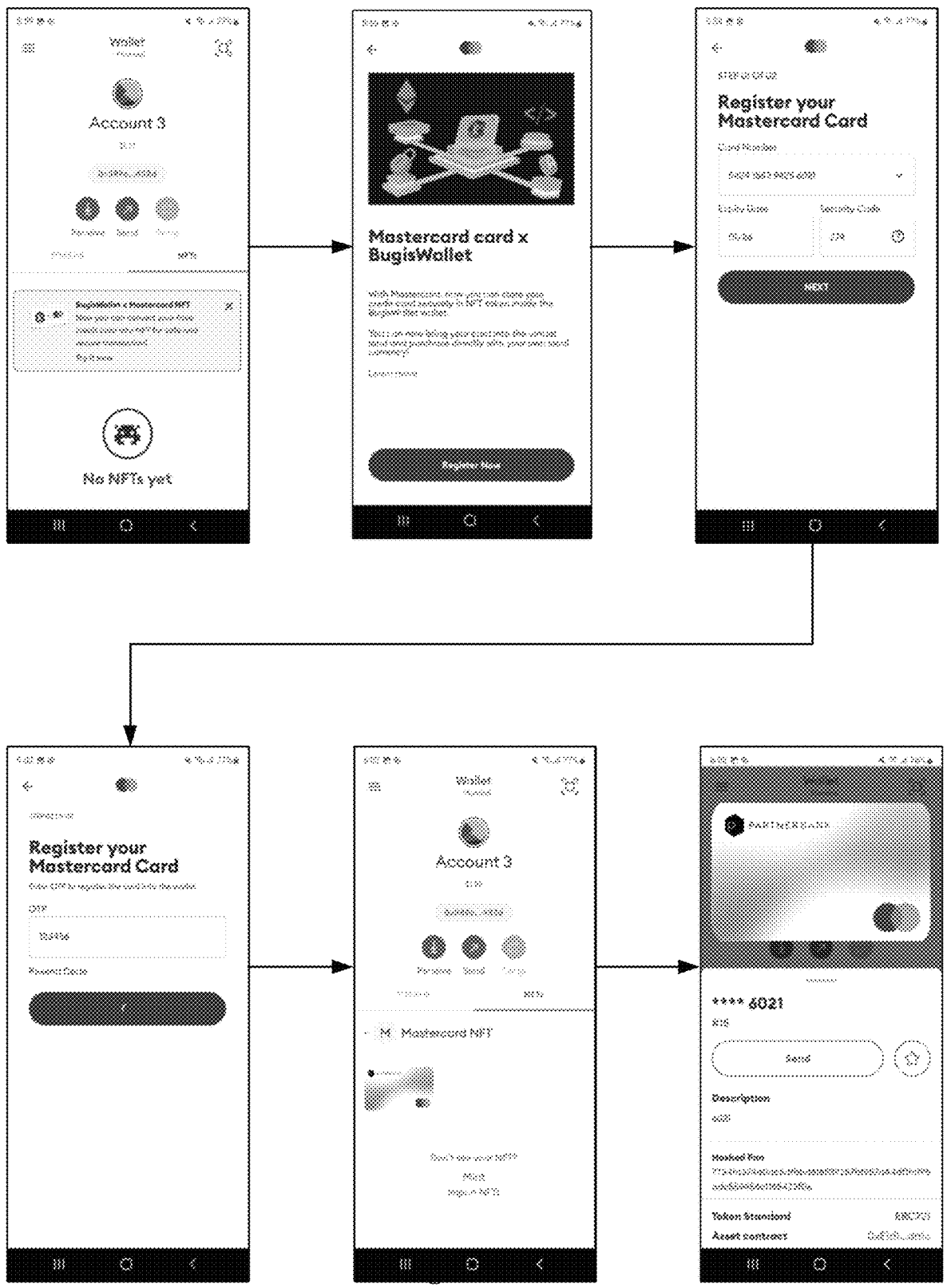
FIGS. 17-19 illustrate example scenarios according to embodiments of the invention.
Figure 18:
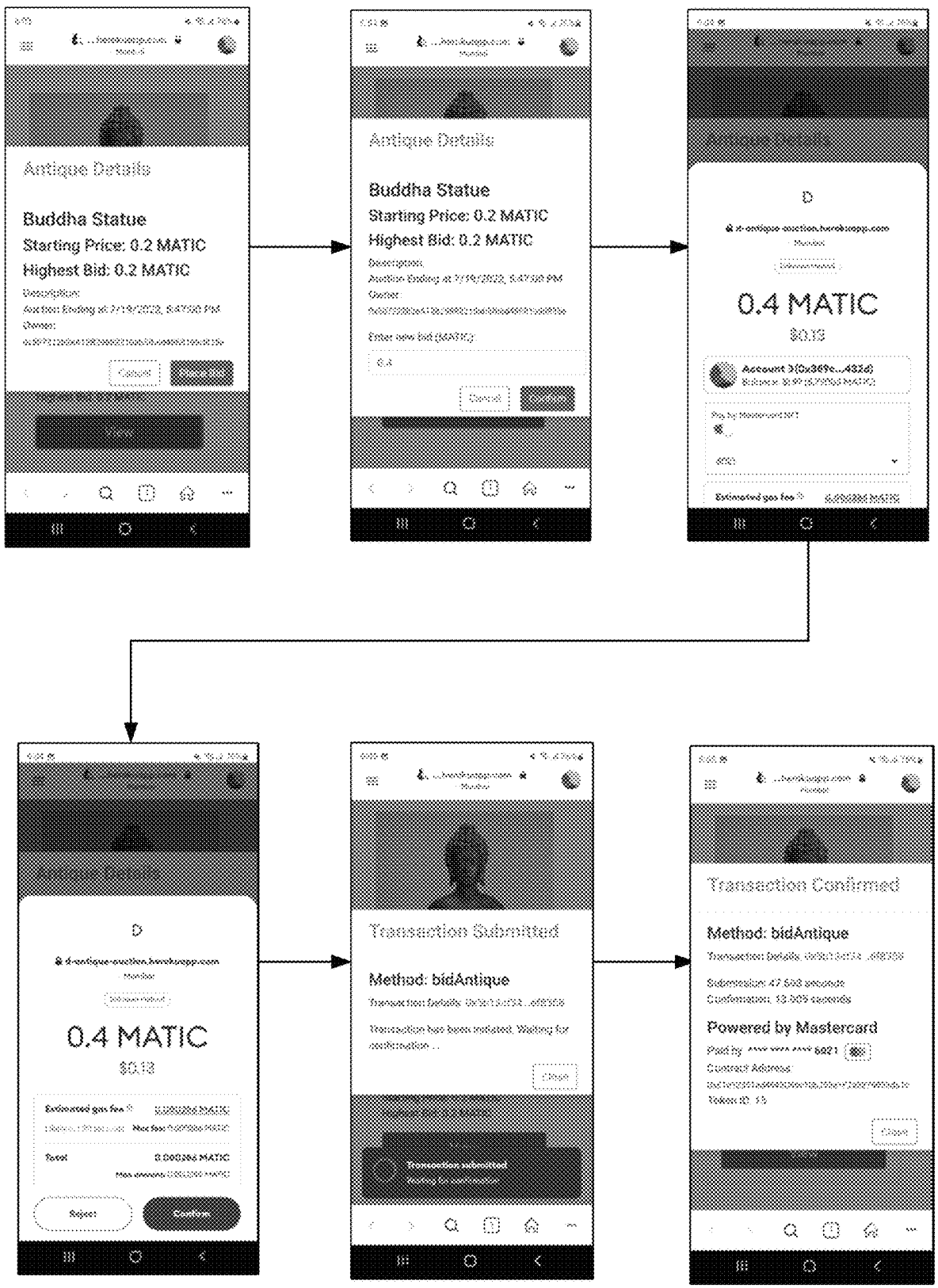
Figure 19:

FIGS. 17-19 illustrate example scenarios according to embodiments of the invention. FIG. 17 illustrates an example scenario of tokenizing a payment card for Web3 and metaverse transactions; FIG. 18 illustrates an example scenario of bidding on an NFT with the tokenized payment card; and FIG. 19 illustrates an example scenario of an NFT transfer from a seller to a user of a winning bid.

Referring to FIG. 17, a bidder (Account 3) wants to bid on an NFT with a tokenized payment card. The user tokenizes the payment card before placing the bid. In the illustrative example, the bidder adds the payment card to the crypto wallet. The tokenization can be performed, for example, using the digitization described with respect to FIG. 3 and results in a financial NFT containing a TUR.

Referring to FIG. 18, once the bidder (Account 3) tokenizes the payment card, the bidder can then bid with the tokenized payment card. In the illustrative example, the bidder placed a bid of 0.4 MATIC on a Buddha Statue NFT using the financial NFT.

Referring to FIG. 19, at the auction end date, the seller (Account 1) ends the auction, after which the Buddha Statue NFT is transferred from the seller (Account 1) to the highest bidder. In the illustrative example, the bidder (Account 3) had the highest bid and the Buddha Statue NFT is transferred from the seller (Account 1) to the bidder (Account 3).

Figure 20:
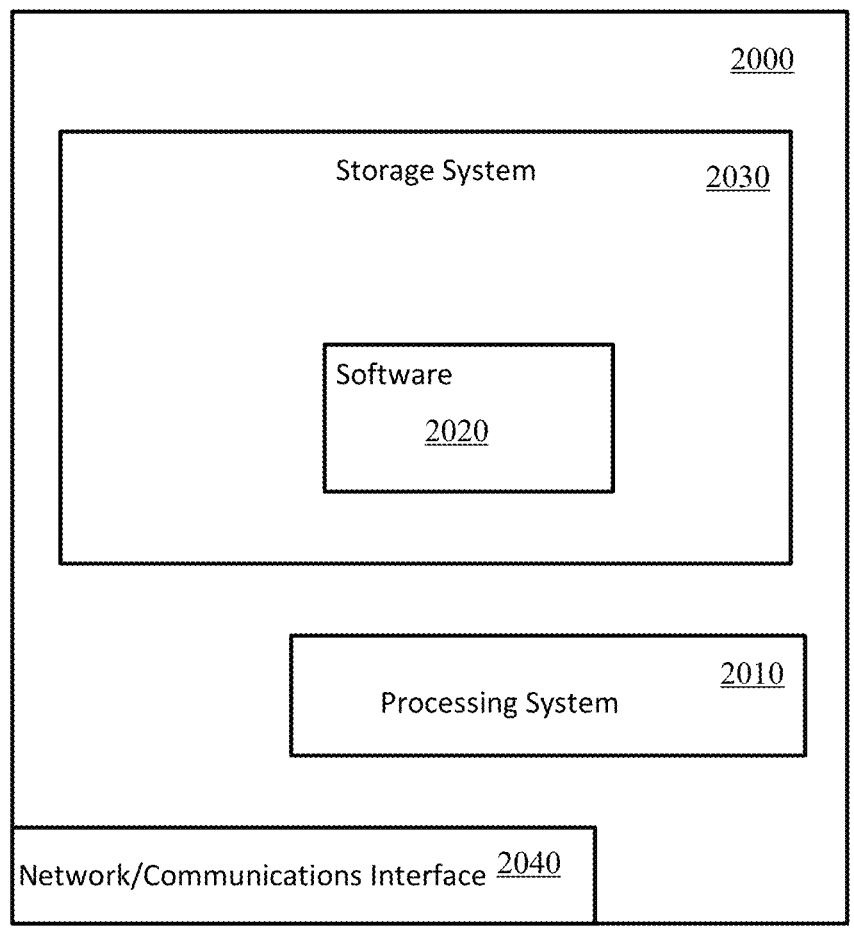
FIG. 20 illustrates components of a computing system that may be used in certain embodiments herein.

FIG. 20 illustrates components of a computing system that may be used in certain embodiments described herein. Referring to FIG. 20, system 2000 may be implemented within a single computing device or distributed across multiple computing devices or sub-systems that cooperate in executing program instructions. The system 2000 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

The system 2000 can include a processing system 2010, which may include one or more processors and/or other circuitry that retrieves and executes software 2020 from storage system 2030. Processing system 2010 may be implemented within a single processing device but may also be distributed across multiple processing devices or sub-systems that cooperate in executing program instructions.

Storage system(s) 2030 can include any computer readable storage media readable by processing system 2010 and capable of storing software 2020. Storage system 2030 may be implemented as a single storage device but may also be implemented across multiple storage devices or sub-systems co-located or distributed relative to each other. Storage system 2030 may include additional elements, such as a controller, capable of communicating with processing system 2010. Storage system 2030 may also include storage devices and/or sub-systems on which data is stored. System 2000 may access one or more storage resources in order to access information to carry out any of the processes indicated by software 2020.

Software 2020, including routines for performing processes, may be implemented in program instructions and among other functions may, when executed by system 2000 in general or processing system 2010 in particular, direct the system 2000 or processing system 2010 to operate as described herein. For example, software 2020 can include, but is not limited to, instructions for smart contract 230 and method 250.

In embodiments where the system 2000 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A communication interface 2040 may be included, providing communication connections and devices that allow for communication between system 2000 and other computing systems (not shown) over a communication network or collection of networks (not shown) or the air.

In some embodiments, system 2000 may host one or more virtual machines.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

It should be understood that as used herein, in no case do the terms "storage media," "computer-readable storage media" or "computer-readable storage medium" consist of transitory carrier waves or propagating signals. Instead, "storage" media refers to non-transitory media.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method, comprising:
   receiving, at a smart contract deployed on a blockchain associated with a non-custodial wallet that is a cryptography wallet of a user, a financial NFT creation request from the non-custodial wallet of a user, the financial NFT creation request comprising encrypted payment card details for a payment card of the user;
   sending a validation request to obtain validation of the payment card associated with the encrypted payment card details, wherein the validation request comprises the encrypted payment card details;
   receiving, at the smart contract, the validation of the payment card, a hashed personal account number (PAN), and a token unique reference of the payment card;
   minting, at the smart contract, a financial NFT representing a tokenized version of the payment card, the financial NFT having a financial NFT identifier and the token unique reference, wherein the financial NFT can be used to make payment;
   storing, at the smart contract, a mapping of the financial NFT identifier, the hashed PAN, the token unique reference, and a consumer wallet address of the non-custodial wallet; and
   sending the financial NFT identifier to the non-custodial wallet.

2. The method of claim 1, wherein sending the validation request to obtain validation of the payment card associated with the encrypted payment card details comprises sending the validation request to a financial NFT service via an oracle.

3. The method of claim 1, further comprising:
   receiving, at the smart contract, a payment function request of the financial NFT, including an electronic signature of the user, a public address of a Web3 merchant, and an amount of blockchain value for a transaction;
   receiving, at the smart contract, a payment request from the Web3 merchant, wherein the payment request includes card transaction details; and
   sending the card transaction details to a financial NFT service.

4. The method of claim 1, further comprising:
   receiving, at the smart contract, a payment request from a Web2 merchant; and
   sending, to a financial NFT service, a detokenization request requesting to detokenize the financial NFT.

5. The method of claim 1, further comprising:
   receiving, at the smart contract, an authorization request from the non-custodial wallet of the user, the authorization request requesting authorization of the financial NFT with an online merchant;

authorizing the financial NFT with the online merchant; and storing, at the smart contract, authorized financial NFT information including the financial NFT identifier, an authorization reference and a wallet address of the online merchant.

6. The method of claim 5, further comprising:

sending the authorized financial NFT information to a metaverse merchant, wherein the online merchant is an online merchant on a metaverse device.

7. The method of claim 5, further comprising:

receiving, at the smart contract, a payment request from the online merchant, the payment request invoking a payment function of the financial NFT, wherein the payment request includes transaction details comprising the financial NFT identifier, the authorization reference, and a transaction amount; and submitting a payment card transaction to a financial NFT service.

8. The method of claim 7, wherein submitting the payment card transaction to the financial NFT service comprises adding a smart contract transaction containing a hashlock.

9. The method of claim 7, wherein submitting the payment request to the financial NFT service comprises outputting a transaction hash comprising a single-use, time-bound cryptogram for the token unique reference.

10. The method of claim 1, further comprising:

receiving, at the smart contract, a merchant card-on-file (COF) NFT creation request from a merchant, the merchant COF NFT creation request comprising a merchant private key, a merchant public address, and the financial NFT identifier;

receiving a user private key from the non-custodial wallet; and minting a merchant COF NFT having a merchant COF NFT identifier, a merchant identifier, the hashed PAN, and the token unique reference, wherein the merchant COF NFT is owned by the merchant.

11. The method of claim 10, further comprising:

receiving a payment request from the merchant, the payment request invoking a payment function of the merchant COF NFT, wherein the payment request comprises the merchant public address, the merchant private key, and a transaction amount; and submitting the payment request to a financial NFT service.

12. The method of claim 11, wherein submitting the payment request to the financial NFT service comprises adding a smart contract transaction containing a hashlock.

13. The method of claim 11, wherein submitting the payment request to the financial NFT service comprises outputting a transaction hash comprising a single-use, time-bound cryptogram for the token unique reference.

14. One or more computer readable storage media having instructions stored thereon that, when executed by a processing system, direct the processing system to perform a method comprising:

receiving, at a smart contract deployed on a blockchain associated with a non-custodial wallet that is a cryptography wallet of a user, a financial NFT creation request from the non-custodial wallet of a user, the financial NFT creation request comprising encrypted payment card details for a payment card of the user;

sending a validation request to obtain validation of the payment card associated with the encrypted payment card details, wherein the validation request comprises the encrypted payment card details;

receiving, at the smart contract, the validation of the payment card, a hashed personal account number (PAN), and a token unique reference of the payment card;

minting, at the smart contract, a financial NFT representing a tokenized version of the payment card, the financial NFT having a financial NFT identifier and the token unique reference, wherein the financial NFT can be used to make payment;

storing, at the smart contract, a mapping of the financial NFT identifier, the hashed personal account number (PAN), the token unique reference, and a consumer wallet address of the non-custodial wallet; and sending the financial NFT identifier to the non-custodial wallet.

15. A system comprising:

a processing system;

one or more storage media; and instructions stored on the one or more storage media that, when executed by the processing system, direct the processing system to at least:

receive, at a smart contract deployed on a blockchain associated with a non-custodial wallet that is a cryptography wallet of a user, a financial NFT creation request from the non-custodial wallet of a user, the financial NFT creation request comprising encrypted payment card details for a payment card of the user;

send a validation request to obtain validation of the payment card associated with the encrypted payment card details, wherein the validation request comprises the encrypted payment card details;

receive, at the smart contract, the validation of the payment card, a hashed personal account number (PAN), and a token unique reference of the payment card;

mint, at the smart contract, a financial NFT representing a tokenized version of the payment card, the financial NFT having a financial NFT identifier and the token unique reference, wherein the financial NFT can be used to make payment;

store, at the smart contract, a mapping of the financial NFT identifier, the hashed personal account number (PAN), the token unique reference, and a consumer wallet address of the non-custodial wallet; and send the financial NFT identifier to the non-custodial wallet.

* * * * *